United States Patent
Im et al.

(10) Patent No.: US 11,386,819 B2
(45) Date of Patent: Jul. 12, 2022

(54) DISPLAY DEVICE INCLUDING A CONNECTION BOARD AND A METHOD FOR TESTING PAD CONNECTION THEREOF

(71) Applicant: Samsung Display Co., Ltd., Yongin-si (KR)

(72) Inventors: Taegon Im, Gwangmyeong-si (KR); Sooyeon Kim, Namyangju-si (KR); JiYe Lee, Suwon-si (KR); Hee-Jeong Seo, Hwaseong-si (KR); Junghwan Cho, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/894,075

(22) Filed: Jun. 5, 2020

(65) Prior Publication Data
US 2021/0027680 A1    Jan. 28, 2021

(30) Foreign Application Priority Data
Jul. 25, 2019    (KR) .......................... 10-2019-0090380

(51) Int. Cl.
  *G09G 3/00* (2006.01)
  *G09G 3/3225* (2016.01)
  *G06F 1/16* (2006.01)

(52) U.S. Cl.
  CPC .......... *G09G 3/006* (2013.01); *G09G 3/3225* (2013.01); *G06F 1/1626* (2013.01); *G09G 2330/12* (2013.01)

(58) Field of Classification Search
  CPC .............. G01R 27/205; G01R 31/2644; G02F 1/13452; G09G 3/006; G09G 3/3225; G09G 2330/12; G09G 3/2092
  See application file for complete search history.

(56) References Cited

U.S. PATENT DOCUMENTS

| | | | |
|---|---|---|---|
| 7,902,647 B2 | 3/2011 | Chung et al. | |
| 2006/0238450 A1* | 10/2006 | Onodera | G02F 1/13452 345/60 |
| 2011/0025972 A1* | 2/2011 | Tseng | G09G 3/006 349/149 |

(Continued)

FOREIGN PATENT DOCUMENTS

| | | |
|---|---|---|
| KR | 10-0618898 B1 | 9/2006 |
| KR | 10-2015-0072263 A | 6/2015 |
| KR | 20160094552 A * | 8/2016 |

*Primary Examiner* — Parul H Gupta
(74) *Attorney, Agent, or Firm* — Lewis Roca Rothgerber Christie LLP

(57) ABSTRACT

A display device includes a display panel including first and second panel pads electrically connected to each other, a connection board including first and second connection board pads connected to the first and second panel pads, respectively, an output pad, and a driving circuit. The driving circuit includes a pull-up resistor connected between a first voltage terminal and a first node, and a comparator configured to compare a voltage at the first node with a reference voltage and to output a contact test signal corresponding to a comparison result to the output pad. The first connection board pad is electrically connected to the first node, and the second connection board pad is connected to a second voltage terminal.

20 Claims, 19 Drawing Sheets

(56) References Cited

U.S. PATENT DOCUMENTS

| | | | |
|---|---|---|---|
| 2014/0029230 A1* | 1/2014 | Oh | H05K 1/14 361/803 |
| 2014/0117998 A1* | 5/2014 | Hwang | G09G 3/006 324/511 |
| 2016/0202298 A1* | 7/2016 | Brahma | G01R 27/205 345/206 |
| 2017/0193870 A1* | 7/2017 | Zhu | G09G 3/006 |

* cited by examiner

DISPLAY DEVICE INCLUDING A CONNECTION BOARD AND A METHOD FOR TESTING PAD CONNECTION THEREOF

CROSS-REFERENCE TO RELATED APPLICATION

This application claims priority to and the benefit of Korean Patent Application No. 10-2019-0090380, filed on Jul. 25, 2019, the entire content of which is hereby incorporated by reference.

BACKGROUND

1. Field

One or more aspects of embodiments of the present disclosure are related to a display device, for example, to a display device including a connection board electrically connected to a display panel.

2. Description of the Related Art

Display devices have been developed for use in multimedia devices such as televisions, portable phones, tablet computers, navigation systems, and game consoles. An organic light emitting display device may display an image using an organic light emitting diode, which generates light by recombination of electrons and holes. An organic light emitting display device may have a fast response speed, and may be driven with low power consumption.

An organic light emitting display device may include a display panel for displaying an image, a host device for providing control signals and image signals to control operations of the display panel, and a connection board for providing the control signals and the image signals from the host device to the display panel.

The connection board and the display panel may be electrically connected to each other through (e.g., via) pads. To transmit the control signals and the image signals to the display panel without distortion, the pads of the connection board should be sufficiently and completely (substantially) connected to pads of the display panel.

The above information disclosed in this Background section is for enhancement of understanding of the background of the present disclosure, and therefore, it may contain information that does not constitute prior art.

SUMMARY

One or more example embodiments of the present disclosure are directed toward a display device including a connection board capable of testing a connection state (or contact state) of pads.

One or more example embodiments of the present disclosure are directed toward a method for testing pad connections in a display device, which is capable of testing a connection state (or contact state) of the pads.

One or more example embodiments of the present disclosure provide a display device including a display panel including first and second panel pads electrically connected to each other, and a connection board including first and second connection board pads electrically connected to the first and second panel pads, respectively, an output pad, and a driving circuit. The driving circuit may include a pull-up resistor electrically connected between a first voltage terminal and a first node, and a comparator configured to compare a voltage at the first node with a reference voltage and to output a contact test signal corresponding to a comparison result to the output pad. The first connection board pad may be electrically connected to the first node, and the second connection board pad may be electrically connected to a second voltage terminal.

In an example embodiment, the display device may include a main board including a first test pad electrically connected to the output pad, and a main controller. The main controller may receive the contact test signal through the first test pad.

In an example embodiment, the connection board may include an input pad, and the driving circuit may include a switch. The switch may be electrically connected between the first connection board pad and the first node, and may operate in response to a switching control signal inputted through the input pad.

In an example embodiment, the display device may include a main board including first and second test pads electrically connected to the output pad and the input pad, respectively, and a main controller. The main controller may output the switching control signal to the second test pad and may receive the contact test signal through the first test pad.

In an example embodiment, a first voltage provided to the first voltage terminal may be higher in level than a second voltage provided to the second voltage terminal.

In an example embodiment, the comparator may output the contact test signal at an active level when the voltage at the first node is higher in level than the reference voltage, and the comparator may output the contact test signal at an inactive level when the voltage at the first node is lower in level than the reference voltage.

In an example embodiment, the driving circuit may be an integrated circuit, and the connection board may be a chip-on-film on which the driving circuit is mounted.

In an example embodiment, the display panel may include a connection line electrically connecting the first and second panel pads.

One or more example embodiments of the present disclosure provide a display device including a display panel including first and second panel pads electrically connected to each other, a main board including first to fourth main board pads, a first test pad, and a main controller, and a connection board including first and second connection board pads electrically connected to the first and second panel pads, respectively, first to fourth main contact pads electrically connected to the first to fourth main board pads, respectively, first and second test lines electrically connecting the first and second connection board pads to the first and second main contact pads, respectively, an intermediate connection line electrically connecting the first main contact pad to the fourth main contact pad, an output pad electrically connected to the first test pad, and a driving circuit. The third main board pad and the fourth main board pad may be electrically connected to each other. The driving circuit may include a pull-up resistor electrically connected between a first voltage terminal and a first node, and a comparator configured to compare a voltage at the first node with a reference voltage and to output a contact test signal corresponding to a comparison result to the output pad. The second main contact pad may be electrically connected to the first node, and the first main contact pad may be electrically connected to a second voltage terminal through the intermediate connection line and the fourth main contact pad. The main controller may receive the contact test signal through the first test pad.

In an example embodiment, the connection board may include a first input pad, and the main board may include a main connection line electrically connecting the third main board pad to the fourth main board pad, and a second test pad electrically connected to the first input pad. The main controller may be configured to provide a first switching control signal to the driving circuit through the second test pad.

In an example embodiment, the driving circuit may include a first switch. The first switch may be electrically connected between the second main contact pad and the first node and may operate in response to the first switching control signal inputted through the first input pad.

In an example embodiment, the connection board may include a second input pad, and the main board may include a third test pad electrically connected to the second input pad. The main controller may be configured to provide a second switching control signal to the driving circuit through the third test pad.

In an example embodiment, the driving circuit may include a second switch. The second switch may be electrically connected between the third main contact pad and the first node and may operate in response to the second switching control signal inputted through the second input pad.

In an example embodiment, the first switching control signal and the second switching control signal may be activated at different time points from each other.

In an example embodiment, a first voltage provided to the first voltage terminal may be higher in level than a second voltage provided to the second voltage terminal.

In an example embodiment, the comparator may output the contact test signal at an active level when the voltage at the first node is higher in level than the reference voltage, and the comparator may output the contact test signal at an inactive level when the voltage at the first node is lower in level than the reference voltage.

In an example embodiment, the main controller may provide the first switching control signal to the driving circuit in a control period after a supply of a power voltage is started.

In an example embodiment, the main controller may provide the first switching control signal to the driving circuit in a blank period of a synchronization signal.

In an example embodiment, the driving circuit may be an integrated circuit, and the connection board may be a chip-on-film on which the driving circuit is mounted.

In an example embodiment, the display panel may include a connection line electrically connecting the first and second panel pads.

One or more example embodiments of the present disclosure provide a method for testing pad connection of a display device including a display panel including first and second panel pads electrically connected to each other, and a connection board including first and second connection board pads electrically connected to the first and second panel pads, respectively, an input pad, and an output pad. The method may include connecting the first and second connection board pads to the first and second panel pads of the display panel, respectively, connecting the first connection board pad to a first node in response to a switching control signal received through the input pad, and comparing a voltage at the first node with a reference voltage and outputting a contact test signal corresponding to a comparison result to the output pad.

In an example embodiment, the display device may include a main board including first and second test pads electrically connected to the output pad and the input pad, respectively, and a main controller. The main controller may output the switching control signal to the second test pad and may receive the contact test signal through the first test pad.

BRIEF DESCRIPTION OF THE DRAWINGS

The accompanying drawings are included to provide a understanding of the present disclosure, and are incorporated in and constitute a part of this specification. The drawings illustrate example embodiments of the present disclosure and, together with the description, serve to explain principles of the present disclosure. In the drawings.

DETAILED DESCRIPTION

Figure 1:
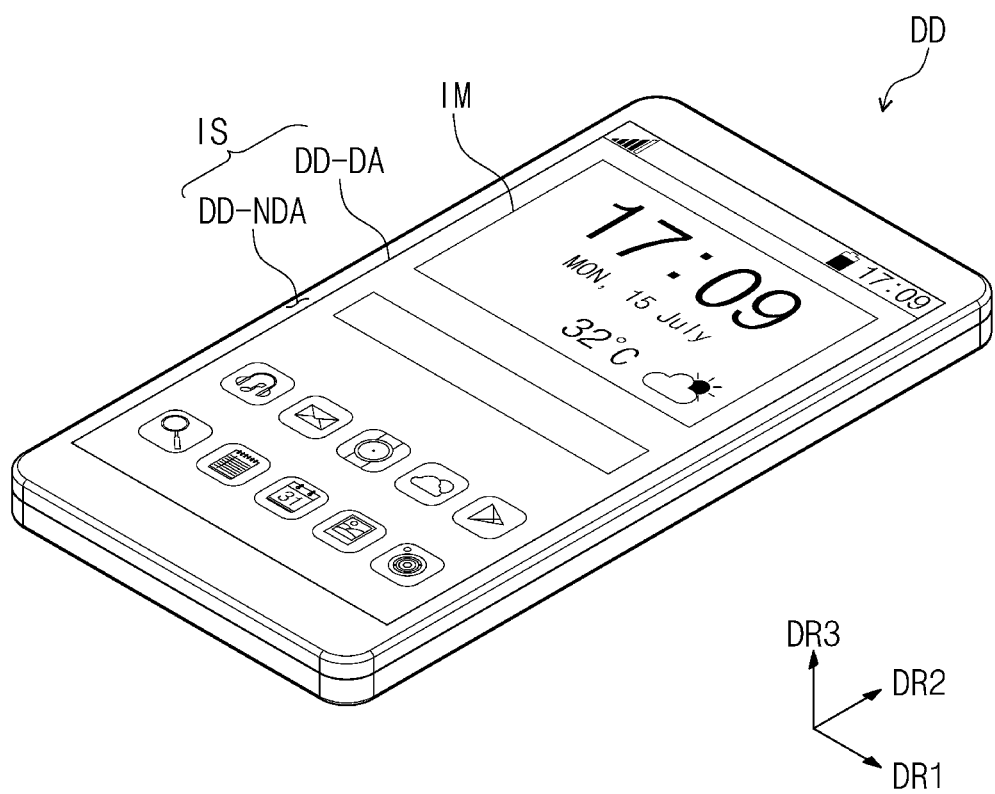
FIG. 1 is a perspective view illustrating a display device according to an example embodiment of the present disclosure.

The present disclosure now will be described more fully hereinafter with reference to the accompanying drawings, in which various embodiments are shown. The present disclosure may, however, be embodied in many different forms, and should not be construed as being limited to the embodiments set forth herein. Rather, these embodiments are provided so that this disclosure will be thorough and complete, and will fully convey the scope of the present disclosure to those skilled in the art. Like reference numerals refer to like elements throughout, and redundant descriptions thereof may be omitted.

It will be understood that when an element such as a layer, region or substrate is referred to as being "on" another element, it can be directly on the other element or intervening elements may be present. In contrast, the term "directly" indicates that there are no intervening elements. As used herein, the term "electrically connected" denotes that elements are connected, for example, via direct contact and/or via electrically conductive intermediary wires, layers, or elements.

The terminology used herein is for the purpose of describing aspects of embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the drawings. It will be understood that such spatially relative terms are intended to encompass different orientations of the device in use or operation, in addition to the orientation depicted in the drawings. For example, if the device in the drawings is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein should be interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be alternatively termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Example embodiments are described herein with reference to cross-sectional illustrations and/or plane illustrations that are idealized example illustrations. In the drawings, the thicknesses of layers and regions may be exaggerated for clarity. Accordingly, variations from the shapes of the illustrations as a result, for example, of manufacturing techniques and/or tolerances, are to be expected. Thus, example embodiments should not be construed as being limited to the shapes of regions illustrated herein, but are to include deviations in shapes that result, for example, from manufacturing. For example, an etching region illustrated as a rectangle may have rounded or curved features. Thus, the regions illustrated in the drawings are schematic in nature and their shapes are not intended to illustrate the actual shape of a region of a device and are not intended to limit the scope of example embodiments.

Hereinafter, example embodiments of the present disclosure will be described in more detail with reference to the accompanying drawings.

FIG. 1 is a perspective view illustrating a display device according to an embodiment of the present disclosure.

Referring to FIG. 1, a display device DD may be a liquid crystal display device, a field emission display device, a plasma display device, or an organic light emitting display device. However, embodiments of the present disclosure are not limited thereto.

In FIG. 1, a flat display device is illustrated as an example of the display device DD. However, embodiments of the present disclosure are not limited thereto. In some embodiments, the display device DD may be a foldable display device or a rollable display device. The display device DD may be used in large-sized electronic devices (e.g., televisions and monitors) and small and middle-sized electronic devices (e.g., portable phones, tablets, car navigation units, game consoles, and smart watches).

The display device DD may display an image on a display surface IS parallel to first and second directions DR1 and DR2 in a third direction DR3 (e.g., on a plane defined by the first and second directions DR1 and DR2, the plane being normal to a third direction DR3). The display surface IS of the display device DD may include a plurality of set or designated areas. The display surface IS on which an image is displayed may correspond to a front surface of the display device DD. The display device DD may include a display area DD-DA in which an image IM is displayed, and a non-display area DD-NDA adjacent to the display area DD-DA. An image may not be displayed in the non-display area DD-NDA. The non-display area DD-NDA may be referred to as a bezel area.

For example, the display area DD-DA may have a quadrilateral shape (e.g., a rectangular shape). The non-display area DD-NDA may surround (e.g., the perimeter of) the display area DD-DA. However, embodiments of the present disclosure are not limited thereto. The display area DD-DA and the non-display area DD-NDA may each have any suitable shape.

Figure 2:
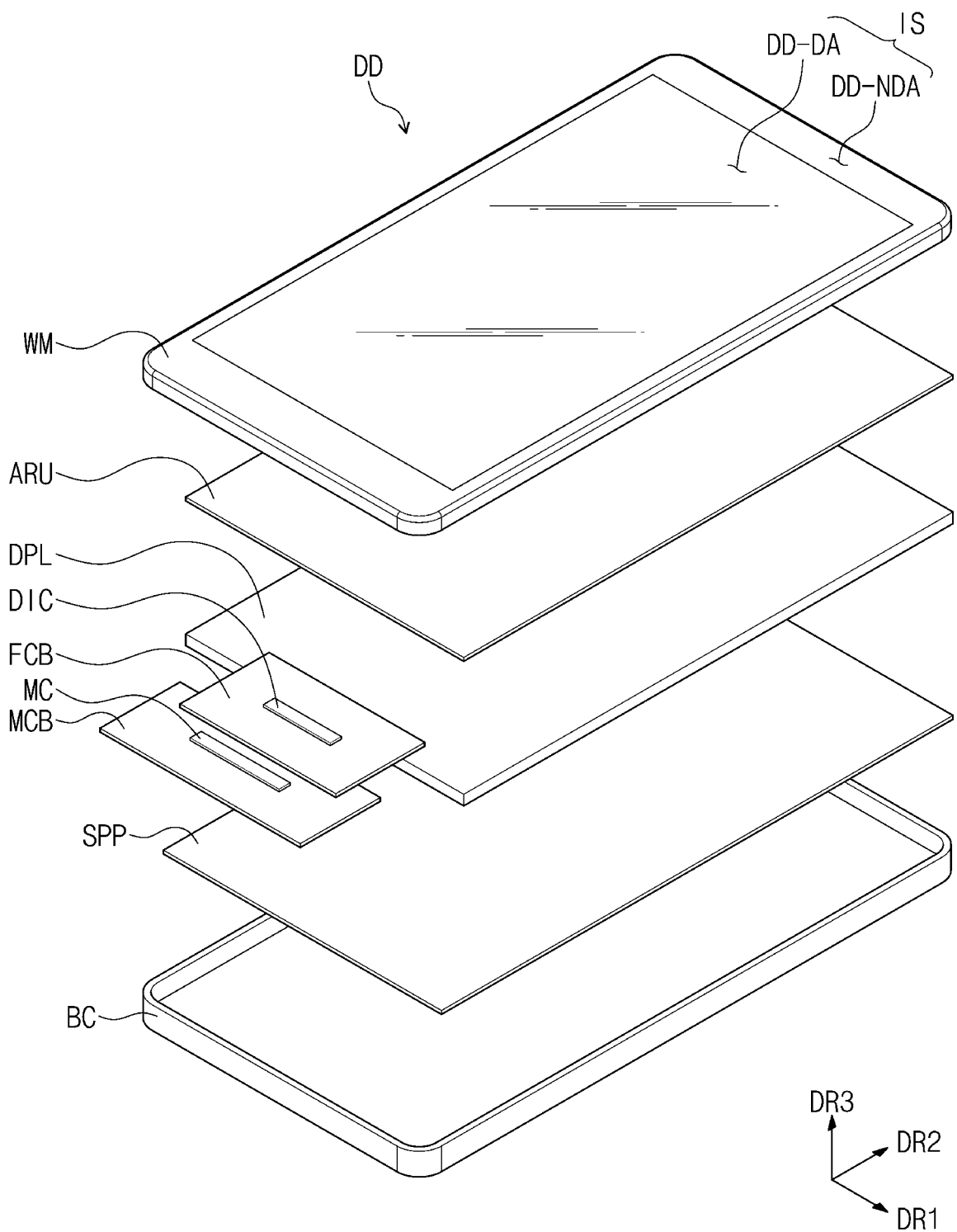
FIG. 2 is an exploded perspective view illustrating a display device according to an embodiment of the present disclosure.

FIG. 2 is an exploded perspective view illustrating a display device according to an embodiment of the present disclosure.

Referring to FIG. 2, the display device DD may include a window member WM, an anti-reflection unit ARU, a display panel DPL, a connection board FCB, a main board MCB, a support member SPP, and a lower case BC.

The window member WM may provide the front surface of the display device DD. The window member WM may include a glass substrate, a sapphire substrate, and/or a plastic substrate. In some embodiments, the window member WM may include a functional coating layer such as an anti-fingerprint layer, an anti-reflection layer, and/or a hard coating layer. In the example embodiment, a flat window member WM is illustrated in the display area DD-DA of FIG. 1. However, the shape of the window member WM may be variously modified. In a certain embodiment, edges of the window member WM, which are opposite to each other in the first direction DR1, may have curved surfaces.

A front surface (or a top surface or a first surface) and a rear surface (or a bottom surface or a second surface) of each member may be defined based on a direction in which an image is displayed. However, the directions indicated by the first to third directions DR1, DR2 and DR3 are relative, and may be interchanged to refer to other sets of directions. Hereinafter, the first to third directions are the directions indicated by the first to third directions DR1, DR2 and DR3 illustrated in FIGS. 1 and 2, respectively.

The display panel DPL may be disposed on a rear surface of (e.g., behind or beneath) the window member WM to generate an image. In some embodiments, the display panel DPL may also sense a user's touch input. In the example embodiment, the display panel DPL providing a flat display surface is illustrated as an example. However, the display panel DPL may have any suitable shape, conformation, or curvature. For example, edges of the display panel DPL that are opposite each other in the first direction DR1 may be bent from a central portion to provide curved surfaces.

The display panel DPL may be a panel for displaying an image, and may be a liquid crystal display (LCD) panel, an electrophoretic display panel, an organic light emitting diode panel, a light emitting diode (LED) panel, an inorganic electro luminescent (EL) display panel, a field emission display (FED) panel, a surface-conduction electron-emitter display (SED) panel, a plasma display panel (PDP), a cathode ray tube (CRT), a micro light emitting element display panel, or a micro LED display panel. Hereinafter, the organic light emitting display device will be described as an example of the display device DD and the organic light emitting diode panel will be described as an example of the display panel DPL. However, embodiments of the present disclosure are not limited thereto. Other various types of display devices and display panels may be used as the display device DD and the display panel DPL.

The anti-reflection unit ARU may be disposed between the window member WM and the display panel DPL. The anti-reflection unit ARU may include a polarizing film and/or a retardation film. The number of the retardation film and a phase retardation length (e.g., λ/4 or λ/2) of the retardation film may be determined based on an operation principle of the anti-reflection unit ARU. The anti-reflection unit ARU may include color filters. The connection board FCB may include a flexible printed circuit board. An end of the connection board FCB may be bonded to pads disposed in an area of the display panel DPL, and thus the connection board FCB may be electrically connected to the display panel DPL.

The connection board FCB may include a driving circuit DIC. In an embodiment, the driving circuit DIC may be an integrated circuit (IC) and may be mounted on the connection board FCB using a chip-on-film (COF) method. In some embodiments, additional passive elements and active elements may be mounted on the connection board FCB. The connection board FCB may provide electrical signals to the display panel DPL through signal lines. Another end of the connection board FCB may be electrically connected to the main board MCB.

The main board MCB may include a main controller MC. The main controller MC may be an integrated circuit (IC) and may be mounted on the main board MCB. In some embodiments, additional passive elements and active elements may be mounted on the main board MCB.

The support member SPP may be disposed on a rear surface of the display panel DPL to support the display panel DPL. The support member SPP may be a metal plate which has a rigidity of a reference value or more. The support member SPP may be a stainless steel plate. The support member SPP may have a black color to block external light incident to the display panel DPL. In some embodiments, the support member SPP may be omitted.

The window member WM and the lower case BC may be coupled to each other to receive (e.g., hold or encase) the display panel DPL.

Figure 3:
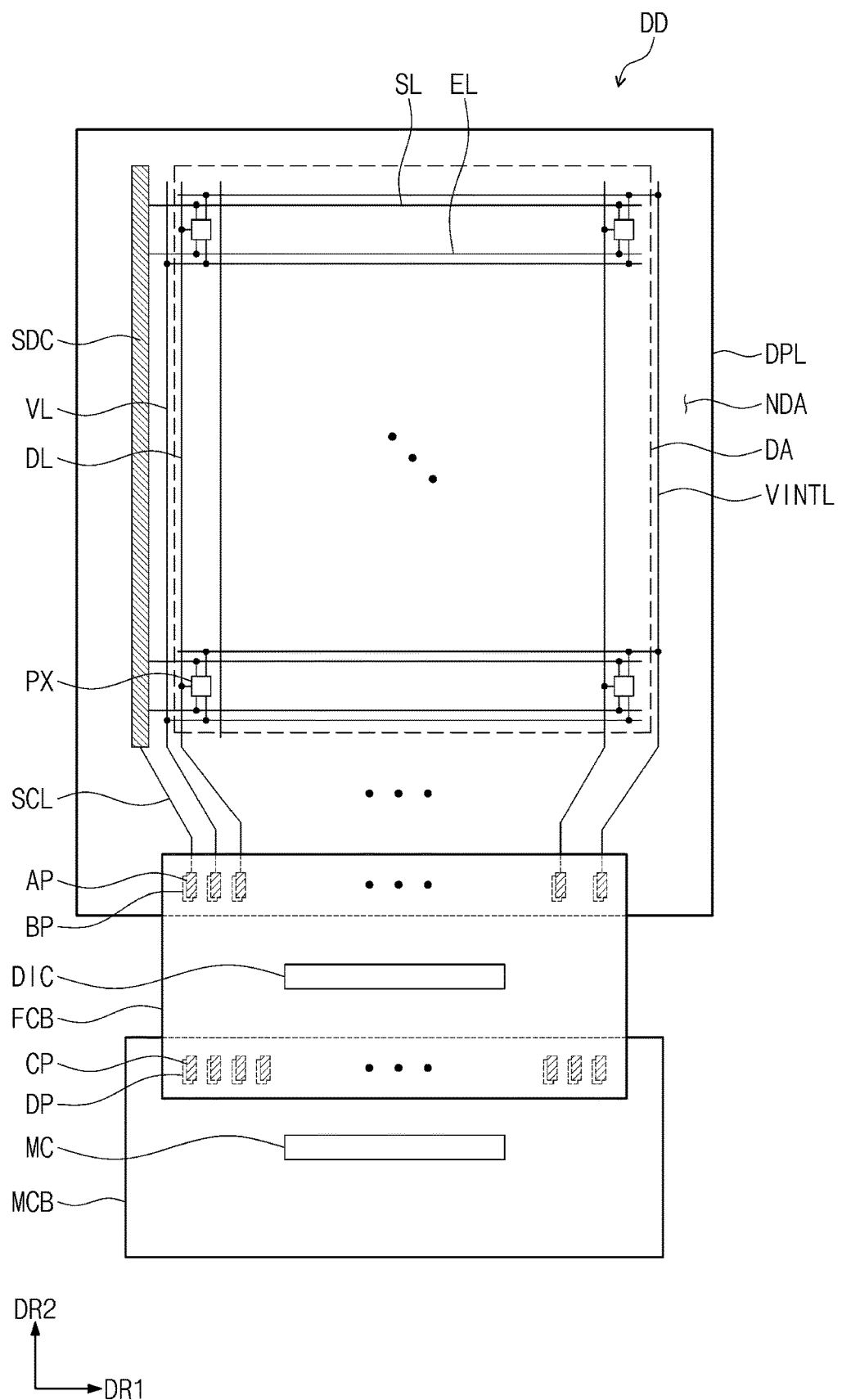
FIG. 3 is a plan view illustrating a display panel, a connection board and a main board of a display device according to an embodiment of present disclosure.
Figure 4:
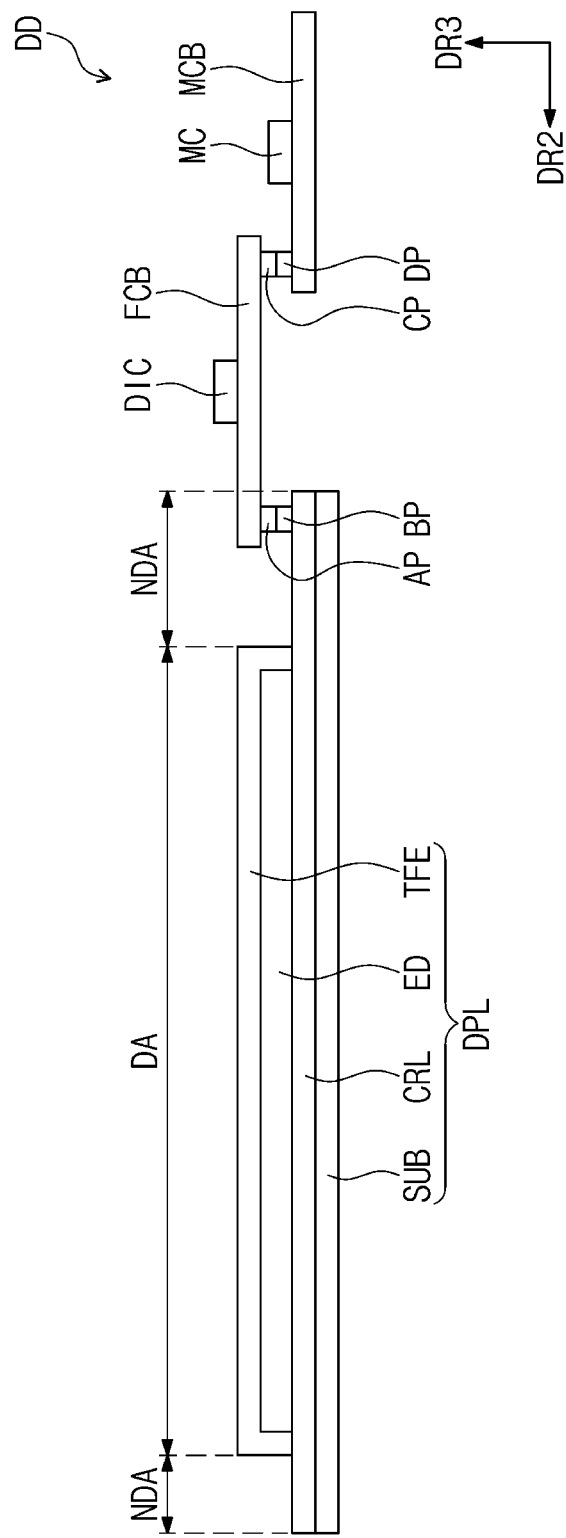
FIG. 4 is a cross-sectional view illustrating connection of a display panel, a connection board and a main board, according to an embodiment of the present disclosure.

FIG. 3 is a plan view illustrating a display panel, a connection board and a main board of a display device according to an embodiment of the present disclosure. FIG. 4 is a cross-sectional view illustrating connection of a display panel, a connection board and a main board, according to an embodiment of the present disclosure.

Referring to FIGS. 3 and 4, the display device DD may include the display panel DPL, the connection board FCB, and the main board MCB.

The display panel DPL may include a base substrate SUB, a circuit element layer CRL, a light emitting element layer ED, and a thin film encapsulation layer TFE. In some embodiments, the display panel DPL may include at least one functional layer (such as a refractive index adjusting layer).

The base substrate SUB may include at least one plastic film. The base substrate SUB may include a plastic substrate, a glass substrate, a metal substrate, or an organic/inorganic composite substrate. In an embodiment, the base substrate SUB may be formed of a flexible material, e.g., polyimide.

The circuit element layer CRL may include a plurality of insulating layers, a plurality of conductive layers, and a semiconductor layer. The plurality of conductive layers of the circuit element layer CRL may provide signal lines and/or a control circuit of a pixel.

The light emitting element layer ED may include at least one or more organic light emitting diodes. The light emitting element layer ED may include an organic layer such as a pixel defining layer.

The thin film encapsulation layer TFE may encapsulate the light emitting element layer ED. The thin film encapsulation layer TFE may include at least one inorganic layer (hereinafter, referred to as 'an encapsulation inorganic layer'). The thin film encapsulation layer TFE may include at least one organic layer (hereinafter, referred to as 'an encapsulation organic layer'). The encapsulation inorganic layer may protect the light emitting element layer ED from moisture/oxygen, and the encapsulation organic layer may protect the light emitting element layer ED from foreign material and/or contaminants (such as dust particles). The encapsulation inorganic layer may include a silicon nitride layer, a silicon oxynitride layer, a silicon oxide layer, a titanium oxide layer, or an aluminum oxide layer. The encapsulation organic layer may include, but is not limited to, an acrylic-based organic layer. However, embodiments of the present disclosure are not limited thereto. In an embodiment, the display panel DPL may include an encapsulation substrate encapsulating the light emitting element layer ED, instead of the thin film encapsulation layer TFE. The encapsulation substrate may be formed of glass, sapphire, or plastic.

The display panel DPL may include a display area DA and a non-display area NDA when viewed in a plan view. In some embodiments, the display area DA and the non-display area NDA of the display panel DPL may correspond to the display area DD-DA (see FIG. 1) and the non-display area DD-NDA (see FIG. 1) of the display device DD, respectively. In some embodiments, the display area DA and the non-display area NDA of the display panel DPL may not be necessarily the same as the display area DD-DA (see FIG. 1) and the non-display area DD-NDA (see FIG. 1) of the display device DD, and may be variously modified depending on the structure and/or design of the display panel DPL. The light emitting element layer ED of FIG. 4 may be disposed in the display area DA.

The display panel DPL may include a plurality of pixels PX. The area in which the plurality of pixels PX is disposed may be defined as the display area DA. In the example embodiment, the non-display area NDA may be defined along a border (e.g., perimeter) of the display area DA.

The display panel DPL may include scan lines SL, data lines DL, emission lines EL, a scan control line SCL, an initialization voltage line VINTL, and a voltage line VL.

A scan driving circuit SDC to which the scan lines SL and the emission lines EL are electrically connected may be disposed in the non-display area NDA at a side of the display area DA.

The scan lines SL may extend from the scan driving circuit SDC in the first direction DR1, and each of the scan lines SL may be electrically connected to a corresponding ones of the pixels PX. Each of the emission lines EL may extend from the scan driving circuit SDC in the first direction DR1 and may be parallel to a corresponding one of the scan lines SL. The data lines DL may extend in the second direction DR2, and each of the data lines DL may be electrically connected to corresponding ones of the pixels PX. The scan control line SCL may provide control signals to the scan driving circuit SDC. The initialization voltage line VINTL may provide an initialization voltage to the plurality of pixels PX. The voltage line VL may be electrically connected to the plurality of pixels PX and may provide a first voltage to the plurality of pixels PX. The voltage line VL may include a plurality of lines extending in the first direction DR1 and a plurality of lines extending in the second direction DR2.

Some of the scan lines SL, the data lines DL, the emission lines EL, the scan control line SCL, the initialization voltage line VINTL and the voltage line VL may be disposed on the same layer, and another or others thereof may be disposed on different layers.

Panel pads BP may be arranged on the circuit element layer CRL of the display panel DPL in the non-display area NDA. The panel pads BP may be arranged in the first direction DR1. In the example embodiment, the panel pads BP are arranged in a (one) line along the first direction DR1. However, embodiments of the present disclosure are not limited thereto. In some embodiments, the panel pads BP may be arranged to constitute two or more rows (lines), or may be arranged in a zigzag formation.

The data lines DL, the scan control line SCL, the initialization voltage line VINTL and the voltage line VL may each be electrically connected to at least one of the panel pads BP.

The panel pads BP of the display panel DPL may be electrically connected to (or may be in contact with) connection board pads AP of the connection board FCB. The connection board FCB may include the driving circuit DIC. The driving circuit DIC may be provided as an integrated circuit (IC). The connection board FCB may be a flexible printed circuit board on which the driving circuit DIC of the integrated circuit is mounted. In FIG. 3, a single driving circuit DIC is mounted on the connection board FCB. As an example, a plurality of integrated circuits may be mounted on the connection board FCB. For example, the driving circuit DIC may include a data driver (or a source driver) for driving the data lines DL of the display panel DPL.

In some embodiments, a plurality of interconnection lines for electrically connecting the connection board pads AP and the driving circuit DIC may be arranged on the connection board FCB.

The panel pads BP of the display panel DPL illustrated in FIG. 3 may be arranged on a top surface of the display panel DPL, and the connection board pads AP may be arranged on a bottom surface of the connection board FCB. Thus, when the panel pads BP are electrically connected to the connection board pads AP, a portion of the connection board FCB may overlap a portion of the top surface of the display panel DPL.

When the panel pads BP are electrically connected to the connection board pads AP, the panel pads BP and the connection board pads AP may not be visible in a plan view. Thus, the panel pads BP and the connection board pads AP are illustrated by dotted lines in FIG. 3. In some embodiments, the panel pads BP may be arranged on a bottom surface of the display panel DPL, and the connection board pads AP may be arranged on a top surface of the connection board FCB. In this case, when the panel pads BP are electrically connected to the connection board pads AP, a portion of the display panel DPL may overlap a portion of the top surface of the connection board FCB.

The connection board FCB may include main contact pads CP. The main board MCB may include main board pads DP. In the example embodiment, the main contact pads CP may be arranged on the bottom surface of the connection board FCB, and the main board pads DP may be arranged on a top surface of the main board MCB. The main contact pads CP of the connection board FCB may be electrically connected to (or in contact with) the main board pads DP of the main board MCB. Thus, when the main contact pads CP are electrically connected to the main board pads DP, a portion of the connection board FCB may overlap a portion of the top surface of the main board MCB.

In some embodiments, the main contact pads CP may be arranged on the top surface of the connection board FCB, and the main board pads DP may be arranged on a bottom surface of the main board MCB. In this case, when the main contact pads CP are electrically connected to the main board pads DP, a portion of the main board MCB may overlap a portion of the top surface of the connection board FCB.

In the example embodiment, the panel pads BP, the connection board pads AP, the main contact pads CP and the main board pads DP are terms defined for the purpose of ease and convenience in description, and these terms are not intended to limit the scopes of the present disclosure.

The main board MCB may include the main controller MC. The main board MCB may include signal lines for transmitting control signals and image signals outputted from the main controller MC to the main board pads DP. The main board MCB may be a rigid printed circuit board or a flexible printed circuit board.

In FIG. 3, for understanding of connection (or contact) of the pads, the panel pads BP are illustrated to be partially offset from the connection board pads AP, and the main contact pads CP are illustrated to be partially offset from the main board pads DP. However, the panel pads BP may be sufficiently or completely connected to the connection board pads AP, and the main contact pads CP may be sufficiently or completely connected to the main board pads DP. For example, corresponding or paired overlapping pads are aligned with no offset so that a contact is made through substantially the entire surface area of both pads when the pads are pressed together or made vertically contiguous to each other.

When the main contact pads CP are sufficiently or completely connected to the main board pads DP, the control signals and the image signals from the main controller MC may be transmitted to the driving circuit DIC without distortion. In addition, when the panel pads BP are sufficiently or completely connected to the connection board pads AP, the control signals and the image signals from the driving circuit DIC may be transmitted to the display panel DPL without distortion.

Figure 5:
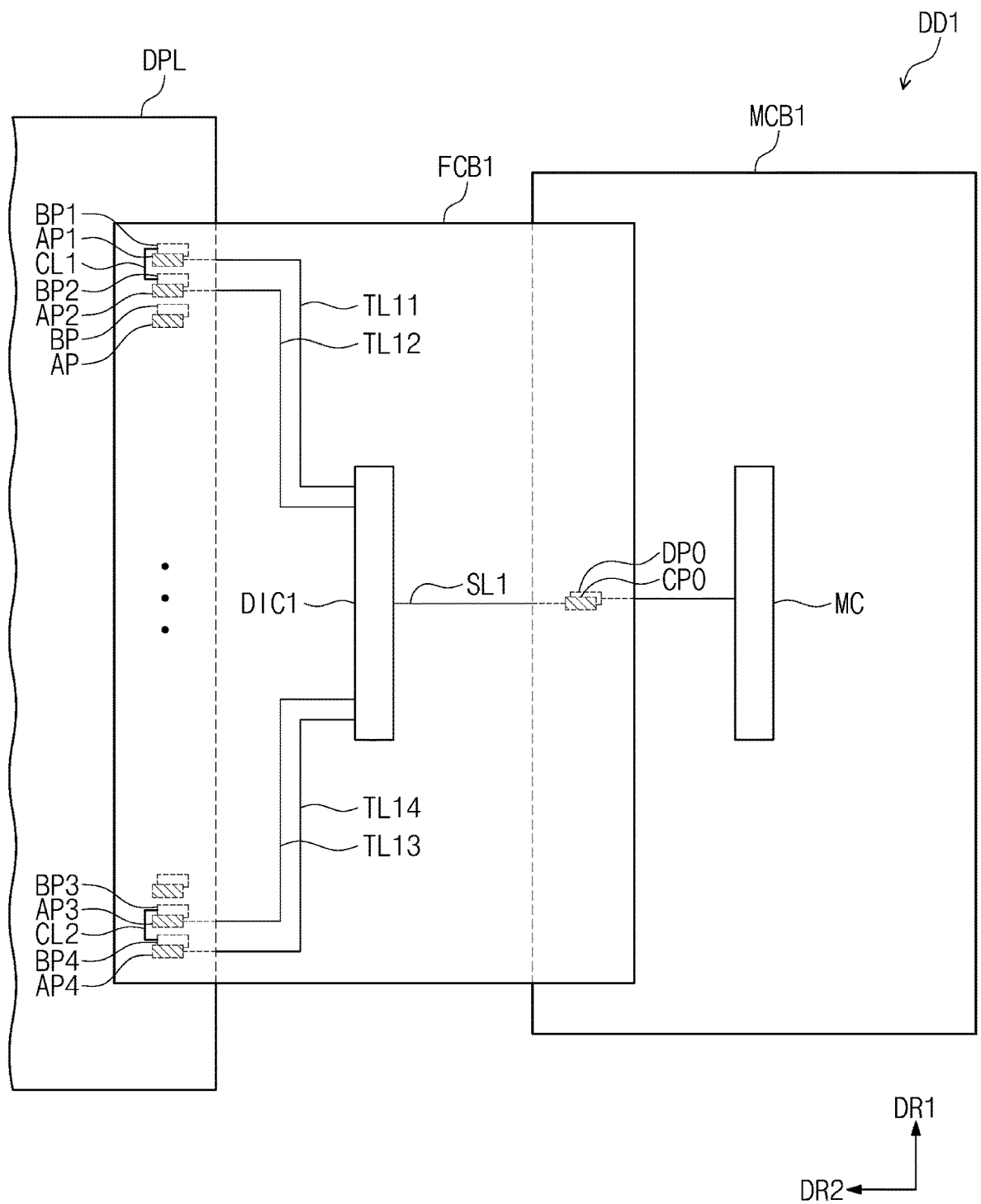
FIG. 5 is a plan view illustrating connection of a display panel and a connection board, and connection of the connection board and a main board, in a display device according to an embodiment of the present disclosure.

FIG. 5 is a plan view illustrating connection of a display panel DPL and a connection board FCB1 and connection of the connection board FCB1 and a main board MCB1 in a display device DD1 according to an embodiment of the present disclosure.

Referring to FIG. 5, the display panel DPL may include first to fourth panel pads BP1 to BP4 and panel pads BP. The first to fourth panel pads BP1 to BP4 may be test pads for testing a connection state (or a contact state) of pads of the display panel DPL and pads of the connection board FCB1. The panel pads BP may be signal pads for receiving control signals and image signals provided from a driving circuit DIC1 to the display panel DPL. The panel pads BP may be electrically connected to the data lines DL, the scan control line SCL, the initialization voltage line VINTL, and the voltage line VL, which are illustrated in FIG. 3.

The first and second panel pads BP1 and BP2 may be disposed adjacent to a side of the display panel DPL, and the third and fourth panel pads BP3 and BP4 may be disposed adjacent to another side of the display panel DPL. In other words, the first and second panel pads BP1 and BP2 may be spaced apart from the third and fourth panel pads BP3 and BP4 in the first direction DR1.

The connection board FCB1 may include first to fourth connection board pads AP1 to AP4 and connection board pads AP. The first to fourth connection board pads AP1 to AP4 may be electrically connected to the first to fourth panel pads BP1 to BP4, respectively. The connection board pads AP may overlap and be electrically connected to the panel pads BP, respectively.

In the embodiment of FIG. 5, the first panel pad BP1 and the second panel pad BP2 may be electrically connected to each other through a first connection line CL1, and the third panel pad BP3 and the fourth panel pad BP4 may be electrically connected to each other through a second connection line CL2. However, embodiments of the present disclosure are not limited thereto. In some embodiments, the first connection line CL1 may be disposed on the connection board FCB1 to electrically connect the first connection board pad AP1 and the second connection board pad AP2. In addition, the second connection line CL2 may be disposed on the connection board FCB1 to electrically connect the third connection board pad AP3 and the fourth connection board pad AP4.

The connection board FCB1 may include first to fourth panel test lines TL11 to TL14. The driving circuit DIC1 may be electrically connected to the first to fourth connection board pads AP1 to AP4 through the first to fourth panel test lines TL11 to TL14, respectively.

In addition, the connection board FCB1 may include an output pad CPO. The output pad CPO may be electrically connected to the driving circuit DIC1 through a first signal line SL1.

The main board MCB1 may include a first test pad DPO. The first test pad DPO may overlap and be connected to the output pad CPO. The main board MCB1 may therefore be electrically connected to the driving circuit DIC1 through (via) the first test pad DPO and the output pad CPO.

Figure 6:
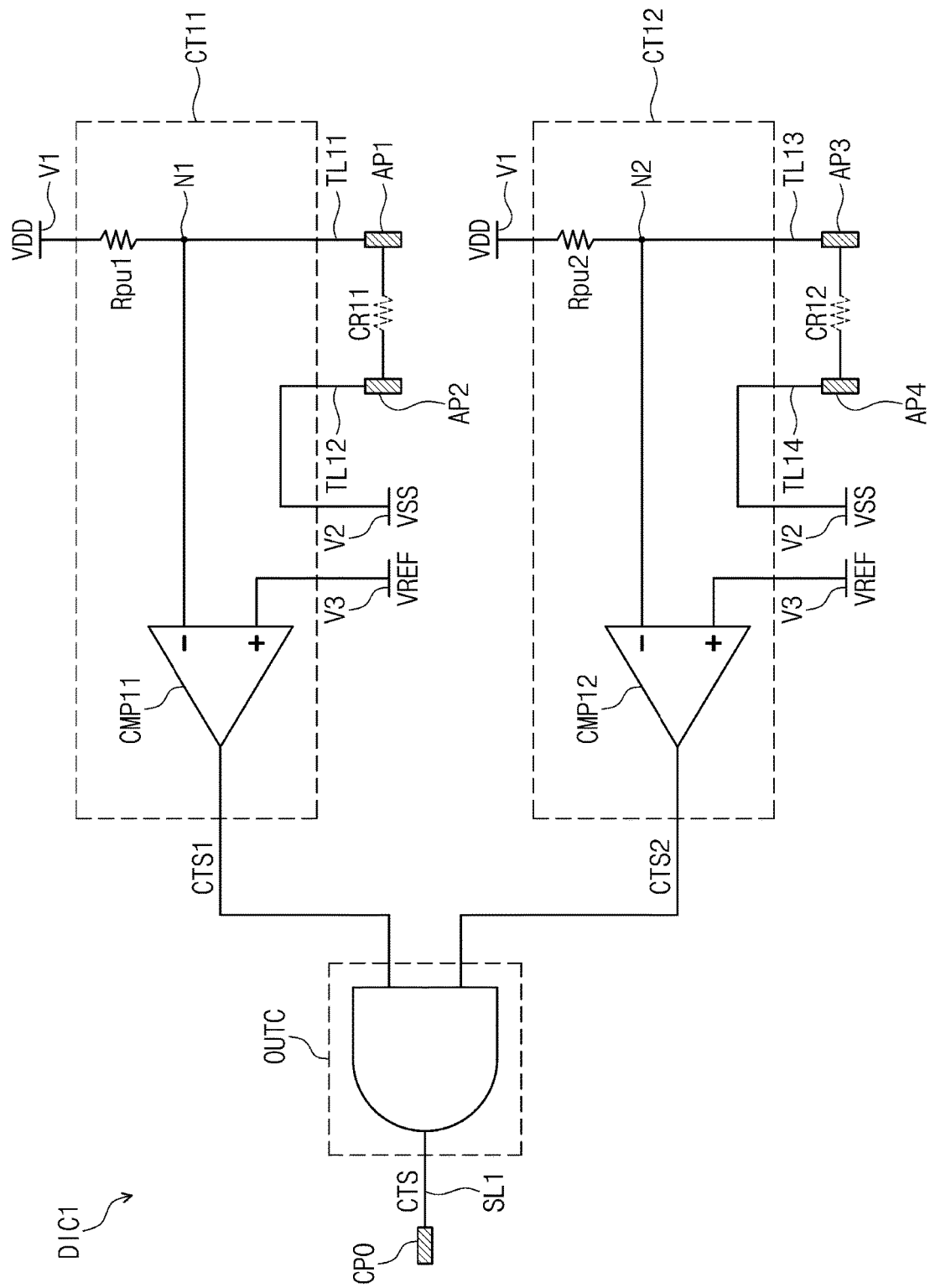
FIG. 6 is a circuit diagram illustrating the circuit configuration of a driving circuit of FIG. 5.

FIG. 6 is a circuit diagram illustrating the circuit configuration of the driving circuit DIC1 of FIG. 5.

Referring to FIGS. 5 and 6, the driving circuit DIC1 may include a first contact test circuit CT11, a second contact test circuit CT12, and an output circuit OUTC. The first contact test circuit CT11 may test a connection state (or a contact state) of the first and second panel pads BP1 and BP2 with the first and second connection board pads AP1 and AP2, respectively, and may output a first contact test signal CTS1. The second contact test circuit CT12 may test a connection state (or a contact state) of the third and fourth panel pads BP3 and BP4 with the third and fourth connection board pads AP3 and AP4, respectively, and may output a second contact test signal CTS2. The output circuit OUTC may receive the first contact test signal CTS1 and the second contact test signal CTS2, and may output a contact test signal CTS.

The first contact test circuit CT11 may include a pull-up resistor Rpu1 and a first comparator CMP11. The pull-up resistor Rpu1 may be electrically connected between a first voltage terminal V1 and a first node N1. The first voltage terminal V1 may receive a power voltage VDD. The first connection board pad AP1 may be electrically connected to the first node N1. The second connection board pad AP2 may be electrically connected to a second voltage terminal V2. The second voltage terminal V2 may receive a ground voltage VSS. The ground voltage VSS may be a voltage of at a lower level than the power voltage VDD.

The first comparator CMP11 may compare a voltage at the first node N1 with a reference voltage VREF received through a third voltage terminal V3, and may output the first contact test signal CTS1 corresponding to a comparison result. The first comparator CMP11 may output the first contact test signal CTS1 at an active level (e.g., a low level) when the voltage at the first node N1 is higher in level than the reference voltage VREF. In addition, the first comparator CMP11 may output the first contact test signal CTS1 at an inactive level (e.g., a high level) when the voltage at the first node N1 is lower in level than the reference voltage VREF. In the example embodiment, a "low level" or "active level" of the first contact test signal CTS1 corresponds to detection of a poor connection (or poor contact), and a "high level" or "inactive level" of the first contact test signal CTS1 corresponds to non-detection of a poor connection (or poor contact), i.e., a normal connection. However, embodiments of the present disclosure are not limited thereto. In some embodiments, the high level of the first contact test signal CTS1 may be defined as the active level, and the low level of the first contact test signal CTS1 may be defined as the inactive level.

As illustrated in FIGS. 5 and 6, when the first and second panel pads BP1 and BP2 are electrically connected to the first and second connection board pads AP1 and AP2, a current path may be formed from the first voltage terminal V1 to the second voltage terminal V2 through the first panel test line TL11, the first connection board pad AP1, the first panel pad BP1, the first connection line CL1, the second panel pad BP2, the second connection board pad AP2, and the second panel test line TL12. Thus, a voltage divided by the pull-up resistor Rpu1 and a contact resistance CR11 according to the connection state (or contact state) of the first and second panel pads BP1 and BP2 with the first and second connection board pads AP1 and AP2 may be set at the first node N1.

The contact resistance CR11 illustrated in FIG. 6 may be an imaginary resistance, and a resistance value of the contact resistance CR11 may be changed depending on the connection state of the first and second panel pads BP1 and BP2 with the first and second connection board pads AP1 and AP2. For example, when the first and second panel pads BP1 and BP2 are sufficiently or completely connected to the first and second connection board pads AP1 and AP2, the resistance value of the contact resistance CR11 may be relatively low and smaller than a set or predetermined value. In this case, the voltage at the first node N1 may be lower in level than the reference voltage VREF, and the first comparator CMP11 may output the first contact test signal CTS1 of the inactive level (e.g., the high level).

In contrast, when the first and second panel pads BP1 and BP2 are incompletely connected to or are not connected to the first and second connection board pads AP1 and AP2, the resistance value of the contact resistance CR11 may be relatively large, and higher in level than a set or predetermined value (e.g., as used to compare with VREF according to the equation V=IR). In this case, the voltage at the first node N1 may be higher than the reference voltage VREF, and the first comparator CMP11 may output the first contact test signal CTS1 of the active level (e.g., the low level).

The second contact test circuit CT12 may include a pull-up resistor Rpu2 and a second comparator CMP12. The pull-up resistor Rpu2 may be electrically connected between a first voltage terminal V1 and a second node N2. The first voltage terminal V1 may receive a power voltage VDD. The third connection board pad AP3 may be electrically connected to the second node N2. The fourth connection board pad AP4 may be electrically connected to a second voltage terminal V2 receiving a ground voltage VSS.

The second comparator CMP12 may compare a voltage at the second node N2 with a reference voltage VREF received through a third voltage terminal V3, and may output the second contact test signal CTS2 corresponding to a comparison result. The second comparator CMP12 may output the second contact test signal CTS2 at an active level (e.g., a low level) when the voltage at the second node N2 is higher in level than the reference voltage VREF. In addition, the second comparator CMP12 may output the second contact test signal CTS2 at an inactive level (e.g., a high level) when the voltage at the second node N2 is lower in level than the reference voltage VREF.

As illustrated in FIGS. 5 and 6, when the third and fourth panel pads BP3 and BP4 are electrically connected to the third and fourth connection board pads AP3 and AP4, a current path may be formed from the first voltage terminal V1 to the second voltage terminal V2 through the third panel test line TL13, the third connection board pad AP3, the third panel pad BP3, the second connection line CL2, the fourth panel pad BP4, the fourth connection board pad AP4, and the fourth panel test line TL14. Thus, a voltage divided by the pull-up resistor Rpu2 and a contact resistance CR12 according to the connection state (or contact state) of the third and fourth panel pads BP3 and BP4 with the third and fourth connection board pads AP3 and AP4 may be set at the second node N2.

The contact resistance CR12 illustrated in FIG. 6 may be an imaginary resistance, and a resistance value of the contact resistance CR12 may be changed depending on the connection state of the third and fourth panel pads BP3 and BP4 with the third and fourth connection board pads AP3 and AP4. For example, when the third and fourth panel pads BP3 and BP4 are sufficiently or completely connected to the third and fourth connection board pads AP3 and AP4, the resistance value of the contact resistance CR12 may be relatively low and smaller than a set or predetermined value. In this case, the voltage at the second node N2 may be lower in level than the reference voltage VREF, and the second comparator CMP12 may output the second contact test signal CTS2 of the inactive level (e.g., the high level).

In contrast, when the third and fourth panel pads BP3 and BP4 are incompletely connected to or are not connected to the third and fourth connection board pads AP3 and AP4, the resistance value of the contact resistance CR12 may be relatively large, and higher in level than a set or predetermined value. In this case, the voltage at the second node N2 may be higher in level than the reference voltage VREF, and the second comparator CMP12 may output the second contact test signal CTS2 of the active level (e.g., the low level).

The output circuit OUTC may receive the first contact test signal CTS1 and the second contact test signal CTS2, and may output the contact test signal CTS to the output pad CPO through the first signal line SL1. When at least one of the first contact test signal CTS1 or the second contact test signal CTS2 is the active level (e.g., the low level), the output circuit OUTC may output the contact test signal CTS at an active level (e.g., a low level). When both the first contact test signal CTS1 and the second contact test signal CTS2 are the inactive level (e.g., simultaneously or concurrently the high level), the output circuit OUTC may output the contact test signal CTS at an inactive level (e.g., a high level).

In other words, the driving circuit DIC1 may output the contact test signal CTS of the inactive level (e.g., the high level) indicating normal connection when it is determined that the first to fourth panel pads BP1 to BP4 are sufficiently or completely connected to the first to fourth connection board pads AP1 to AP4. The driving circuit DIC1 may output the contact test signal CTS of the active level (e.g., the low level) indicating detection of poor connection when it is determined that at least one of the first to fourth panel pads BP1 to BP4 is insufficiently connected to at least one of the first to fourth connection board pads AP1 to AP4. The contact test signal CTS outputted from the driving circuit DIC1 may be transmitted to the main controller MC through (via) the first signal line SL1, the output pad CPO, and the first test pad DPO.

When the display panel DPL is electrically connected to the connection board FCB1, the driving circuit DIC1 according to the embodiment of the present disclosure may test the connection state of the first to fourth panel pads BP1 to BP4 and the first to fourth connection board pads AP1 to AP4, and may output the contact test signal CTS. Thus, a manufacturer or user of the display device DD1 may easily determine a connection state of the display panel DPL and the connection board FCB1 using the contact test signal CTS received from the driving circuit DIC1 to the main controller MC. In particular, the connection state of the display panel DPL and the connection board FCB1 may be tested without needing an additional test apparatus or probe, and thus a manufacturing cost and a test time may be reduced.

Figure 7:
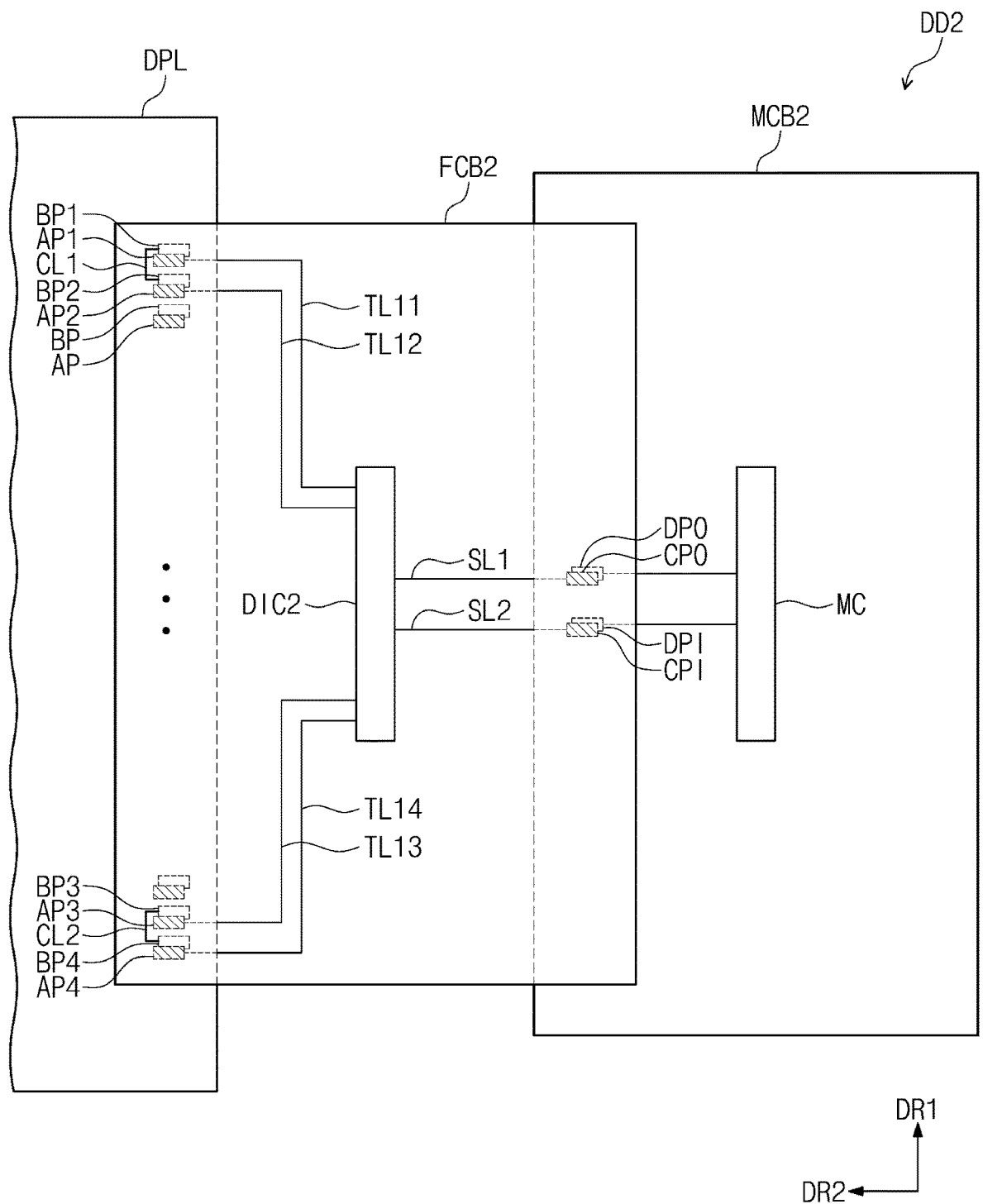
FIG. 7 is a plan view illustrating connection of a display panel and a connection board, and connection of the connection board and a main board, in a display device according to an embodiment of the present disclosure.

FIG. 7 is a plan view illustrating connection of a display panel DPL with a connection board FCB2, and connection of the connection board FCB2 with a main board MCB2, in a display device DD2 according to an embodiment of the present disclosure. In the embodiment of FIG. 7, components that are the same as those in the embodiment of FIG. 5 will be indicated by the same reference designators, and detailed descriptions thereof will be omitted.

The display panel DPL, the connection board FCB2, and the main board MCB2 of the display device DD2 illustrated in FIG. 7 may have similar components to those of the display panel DPL, the connection board FCB1 and the main board MCB1 of the display device DD1 illustrated in FIG. 5. However, the connection board FCB2 of FIG. 7 may include a second signal line SL2 and an input pad CPI. The input pad CPI may be electrically connected to a driving circuit DIC2 through the second signal line SL2.

The main board MCB2 may include a second test pad DPI. The second test pad DPI may be electrically connected to the input pad CPI. The main board MCB2 may be electrically connected to the driving circuit DIC2 through the second test pad DPI.

Figure 8:
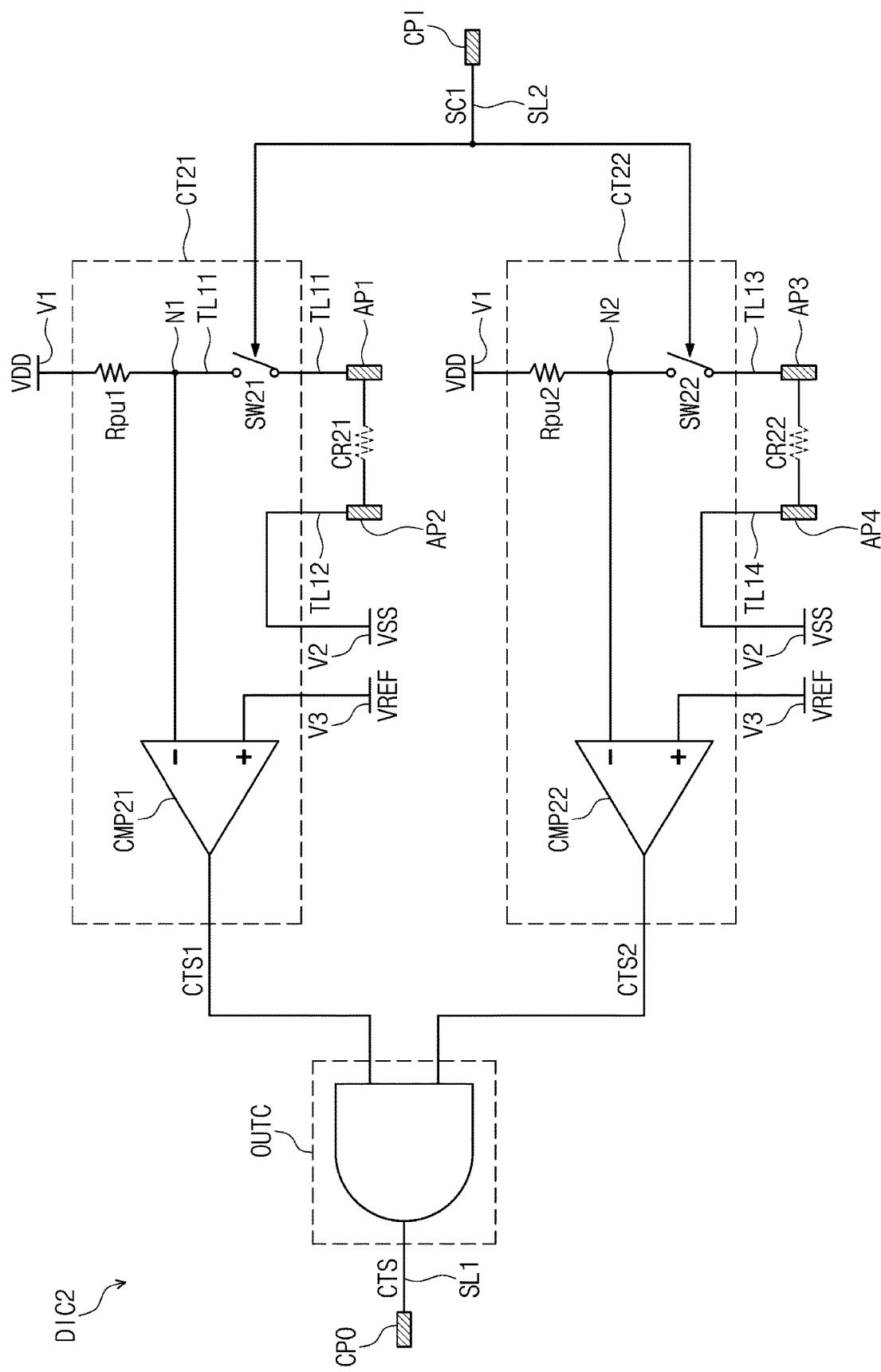
FIG. 8 is a circuit diagram illustrating the circuit configuration of a driving circuit of FIG. 7.

FIG. 8 is a circuit diagram illustrating the circuit configuration of the driving circuit DIC2 of FIG. 7. In the embodiment of FIG. 8, components that are the same as those in the embodiment of FIG. 6 will be indicated by the same reference designators, and detailed descriptions thereof will be omitted.

Referring to FIGS. 7 and 8, the driving circuit DIC2 may include a first contact test circuit CT21, a second contact test circuit CT22, and an output circuit OUTC. The first contact test circuit CT21 may test a connection state (or a contact state) of the first and second panel pads BP1 and BP2 with the first and second connection board pads AP1 and AP2 in response to a switching control signal SC1 inputted through the input pad CPI, and may output a first contact test signal CTS1. The switching control signal SC1 may be outputted from the main controller MC of the main board MCB2 illustrated in FIG. 7, and may be transmitted to the driving circuit DIC2 through (via) the second test pad DPI and the input pad CPI of the connection board FCB2.

The first contact test circuit CT21 may include a pull-up resistor Rpu1, a switch SW21, and a first comparator CMP21. The pull-up resistor Rpu1 may be electrically connected between a first voltage terminal V1 and a first node N1. The switch SW21 may be electrically connected between the first node N1 and the first connection board pad AP1 and may be turned on/off in response to the switching control signal SC1. The first voltage terminal V1 may receive a power voltage VDD. The second connection board pad AP2 may be electrically connected to a second voltage terminal V2 receiving a ground voltage VSS.

When the switching control signal SC1 is at a set or predetermined level (e.g., a high level), the switch SW21 may be turned on. In other words, when the switching control signal SC1 is at the high level, a current path may be formed from the first voltage terminal V1 to the second voltage terminal V2 through the switch SW21, the first panel test line TL11, the first connection board pad AP1, the first panel pad BP1, the first connection line CL1, the second panel pad BP2, the second connection board pad AP2, and the second panel test line TL12. Thus, a voltage divided by the pull-up resistor Rpu1 and a contact resistance CR21 according to the connection state (or contact state) of the first and second panel pads BP1 and BP2 with the first and second connection board pads AP1 and AP2 may be set at the first node N1.

The second contact test circuit CT22 may test a connection state (or a contact state) of the third and fourth panel pads BP3 and BP4 with the third and fourth connection board pads AP3 and AP4 in response to the switching control signal SC1 inputted through the input pad CPI, and may output a second contact test signal CTS2. The output circuit OUTC may receive the first contact test signal CTS1 and the second contact test signal CTS2 and may output a contact test signal CTS.

The second contact test circuit CT22 may include a pull-up resistor Rpu2, a switch SW22, and a second comparator CMP22. The pull-up resistor Rpu2 may be electrically connected between a first voltage terminal V1 and a second node N2. The switch SW22 may be electrically connected between the second node N2 and the third connection board pad AP3 and may be turned on/off in response to the switching control signal SC1. The first voltage terminal V1 may receive a power voltage VDD. The fourth connection board pad AP4 may be electrically connected to a second voltage terminal V2 receiving a ground voltage VSS.

When the switching control signal SC1 is at a set or predetermined level (e.g., the high level), the switch SW22 may be turned on. In other words, when the switching control signal SC1 is at the high level, a current path may be formed from the first voltage terminal V1 to the second voltage terminal V2 through the switch SW22, the third panel test line TL13, the third connection board pad AP3, the third panel pad BP3, the second connection line CL2, the fourth panel pad BP4, the fourth connection board pad AP4, and the fourth panel test line TL14. Thus, a voltage divided by the pull-up resistor Rpu2 and a contact resistance CR22 according to the connection state (or contact state) of the third and fourth panel pads BP3 and BP4 with the third and fourth connection board pads AP3 and AP4 may be set at the second node N2.

The first contact test circuit CT21 and the second contact test circuit CT22 may operate in response to the switching control signal SC1. In a test mode, the main controller MC of FIG. 7 may output the switching control signal SC1 at a set a predetermined level (e.g., the high level) to test a connection state of the display panel DPL and the connection board FCB2.

Figure 9:
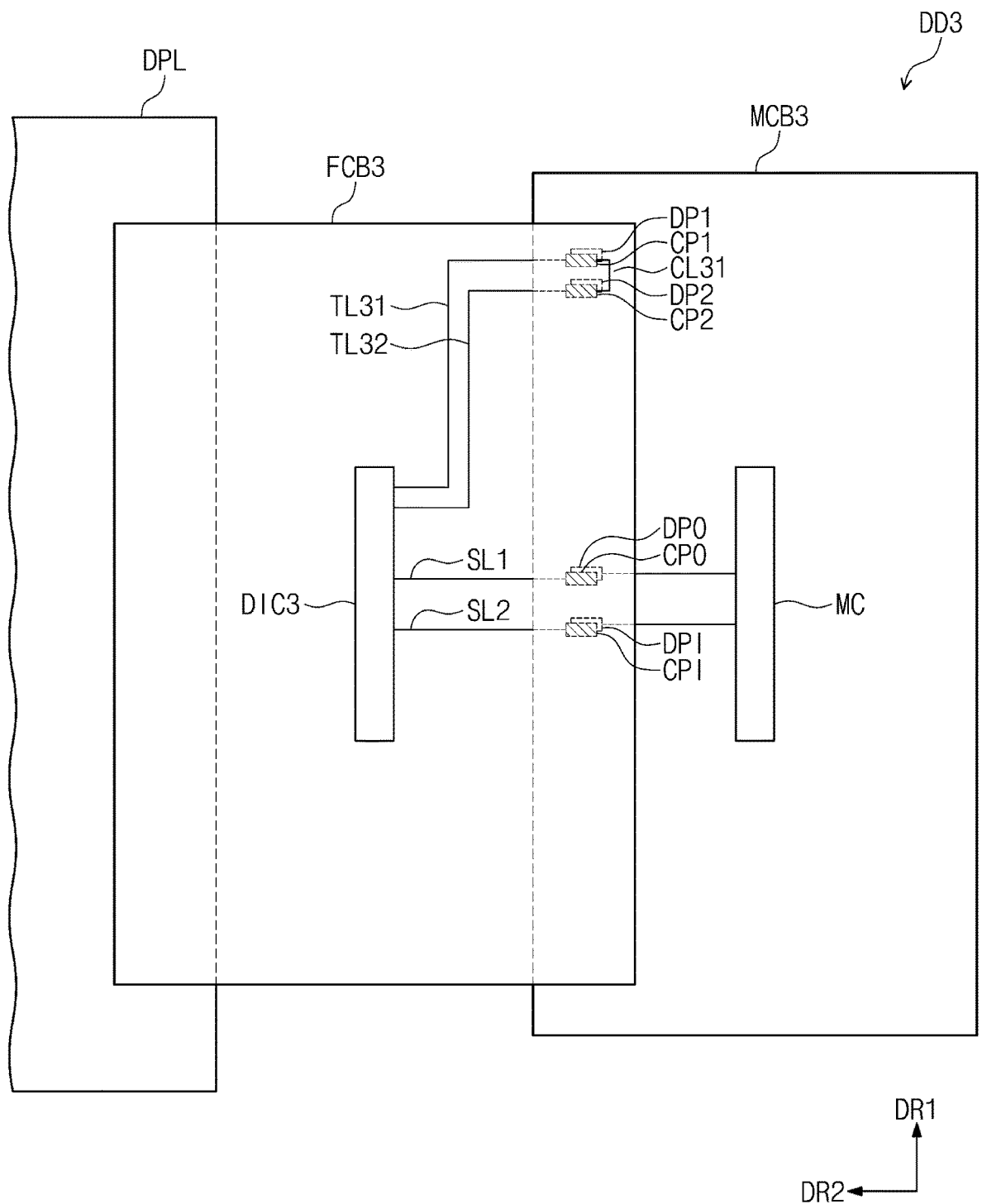
FIG. 9 is a plan view illustrating connection of a display panel and a connection board, and connection of the connection board and a main board, in a display device according to an embodiment of the present disclosure.

FIG. 9 is a plan view illustrating connection of a display panel DPL and a connection board FCB3, and connection of the connection board FCB3 and a main board MCB3, in a display device DD3 according to an embodiment of the present disclosure. In the embodiment of FIG. 9, components that are the same as those in the embodiment of FIG. 5 will be indicated by the same reference designators, and detailed descriptions thereof will be omitted.

The connection board FCB3 of FIG. 9 may include first and second main contact pads CP1 and CP2, first and second board test lines TL31 and TL32, a second signal line SL2, and an input pad CPI. The main board MCB3 may include first and second main board pads DP1 and DP2, a second test pad DPI, and an intermediate connection line CL31. The intermediate connection line CL31 may electrically connect the first and second main board pads DP1 and DP2. In some embodiments, the intermediate connection line CL31 may be disposed on or in the connection board FCB3 to electrically connect the first and second main contact pads CP1 and CP2.

Figure 10:
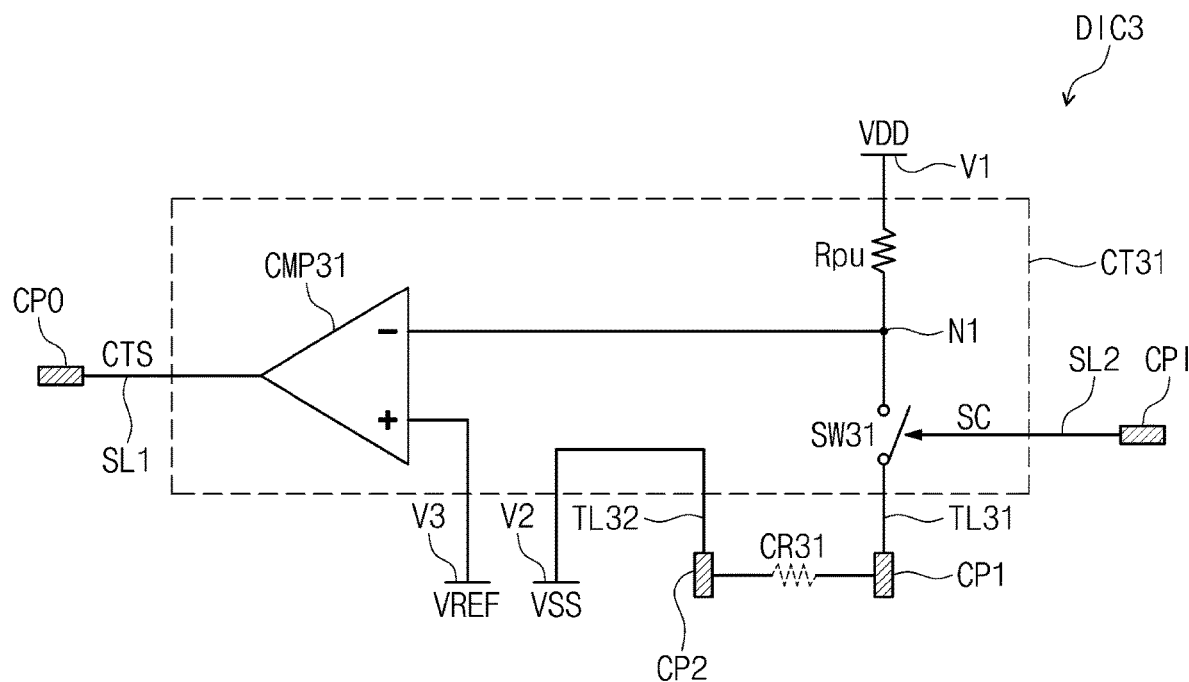
FIG. 10 is a circuit diagram illustrating the circuit configuration of a driving circuit of FIG. 9.

FIG. 10 is a circuit diagram illustrating the circuit configuration of a driving circuit DIC3 of FIG. 9.

Referring to FIGS. 9 and 10, the driving circuit DIC3 may include a contact test circuit CT31. The contact test circuit CT31 may test a connection state (or a contact state) of the first and second main contact pads CP1 and CP2 with the first and second main board pads DP1 and DP2 in response to a switching control signal SC inputted through the input pad CPI, and may output a contact test signal CTS. The switching control signal SC may be outputted from the main controller MC of the main board MCB3 illustrated in FIG. 9, and may be transmitted to the driving circuit DIC3 through the second test pad DPI and the input pad CPI of the connection board FCB3.

The contact test circuit CT31 may include a pull-up resistor Rpu, a switch SW31, and a comparator CMP31. The pull-up resistor Rpu may be electrically connected between a first voltage terminal V1 and a first node N1. The first voltage terminal V1 may receive a power voltage VDD. The switch SW31 may be electrically connected between the first node N1 and the first main contact pad CP1 and may be turned on/off in response to the switching control signal SC. The second main contact pad CP2 may be electrically connected to a second voltage terminal V2 receiving a ground voltage VSS.

When the switching control signal SC is at a set or predetermined level (e.g., a high level), the switch SW31 may be turned on. In other words, when the switching control signal SC is at the high level, a current path may be formed from the first voltage terminal V1 to the second voltage terminal V2 through the switch SW31, the first board test line TL31, the first main contact pad CP1, the first main board pad DP1, the intermediate connection line CL31, the second main board pad DP2, the second main contact pad CP2, and the second board test line TL32. Thus, a voltage divided by the pull-up resistor Rpu and a contact resistance CR31 according to the connection state (or contact state) of the first and second main contact pads CP1 and CP2 with the first and second main board pads DP1 and DP2 may be set at the first node N1.

The contact test circuit CT31 may operate in response to the switching control signal SC. In a test mode, the main controller MC of FIG. 9 may output the switching control signal SC at a set or predetermined level (e.g., the high level) to test a connection state of the connection board FCB3 and the main board MCB3.

Figure 11:
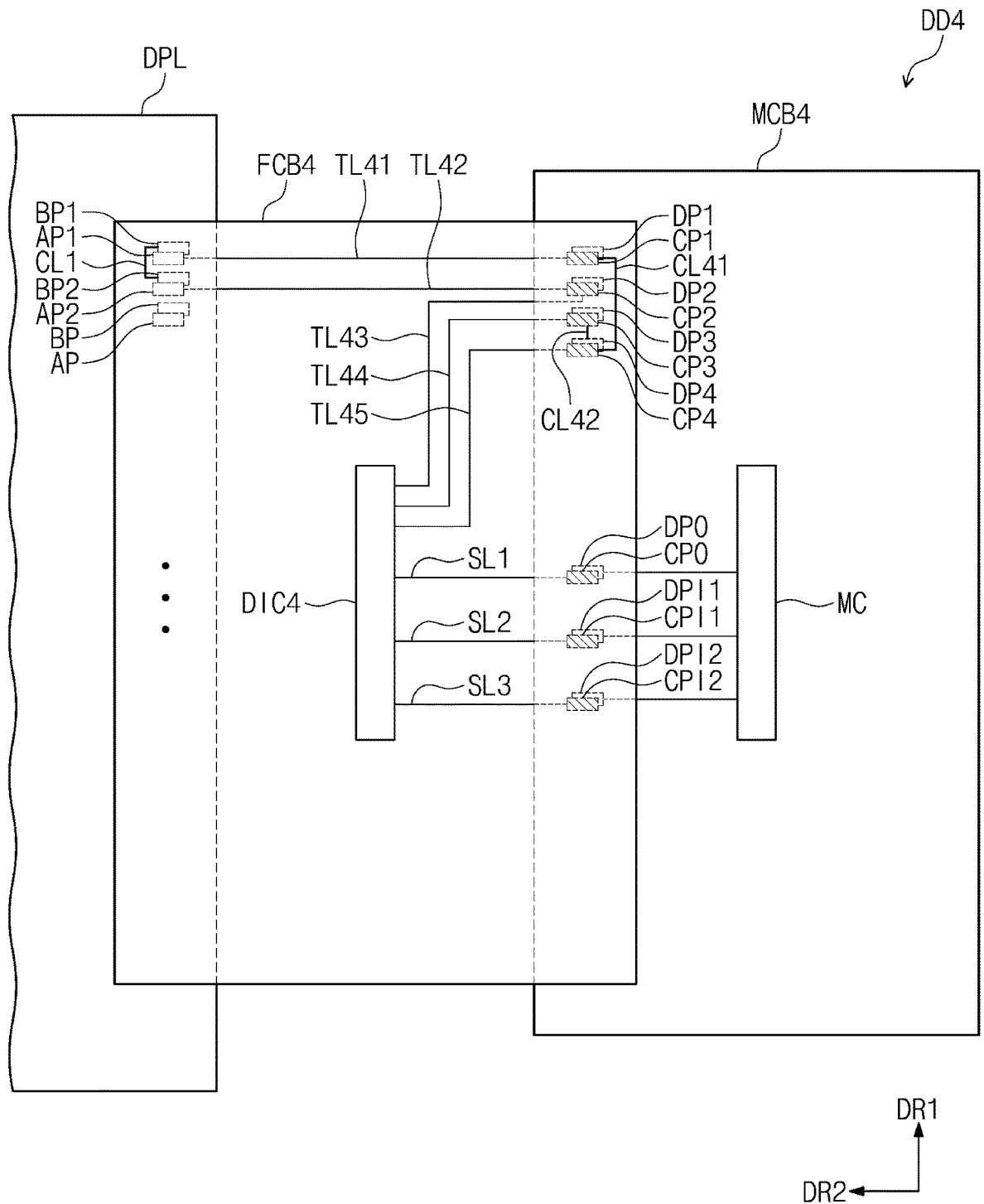
FIG. 11 is a plan view illustrating connection of a display panel and a connection board, and connection of the connection board and a main board, in a display device according to an embodiment of the present disclosure.

FIG. 11 is a plan view illustrating connection of a display panel DPL and a connection board FCB4, and connection of the connection board FCB4 and a main board MCB4 in a display device DD4 according to an embodiment of the present disclosure.

Referring to FIG. 11, the display panel DPL may include first and second panel pads BP1 and BP2, panel pads BP, and a connection line CL1. The first and second panel pads BP1 and BP2 may be test pads for testing a connection state (or a contact state) of pads of the display panel DPL and pads of the connection board FCB4. The panel pads BP may be signal pads for receiving control signals and image signals provided from a driving circuit DIC4 to the display panel DPL. The panel pads BP may be electrically connected to the data lines DL, the scan control line SCL, the initialization voltage line VINTL, and the voltage line VL, which are illustrated in FIG. 3.

The connection board FCB4 may include first and second connection board pads AP1 and AP2, first to fourth main contact pads CP1 to CP4, first to fifth test lines TL41 to TL45, first to third signal lines SL1 to SL3, first and second input pads CPI1 and CPI2, an output pad CPO, an intermediate connection line CL41, and a driving circuit DIC4.

The first and second test lines TL41 and TL42 may electrically connect the first and second connection board pads AP1 and AP2 to the first and second main contact pads CP1 and CP2, respectively. The third to fifth test lines TL43 to TL45 may electrically connect the second to fourth main contact pads CP2 to CP4 to the driving circuit DIC4.

The first to third signal lines SL1 to SL3 may electrically connect the output pad CPO and the first and second input pads CPI1 and CPI2 to the driving circuit DIC4. The intermediate connection line CL41 may electrically connect the first main contact pad CP1 to the fourth main contact pad CP4.

The main board MCB4 may include first to fourth main board pads DP1 to DP4, first to third test pads DPO, DPI1 and DPI2, a main connection line CL42, and a main controller MC. The main connection line CL42 may electrically connect the third main board pad DP3 to the fourth main board pad DP4.

Figure 12:
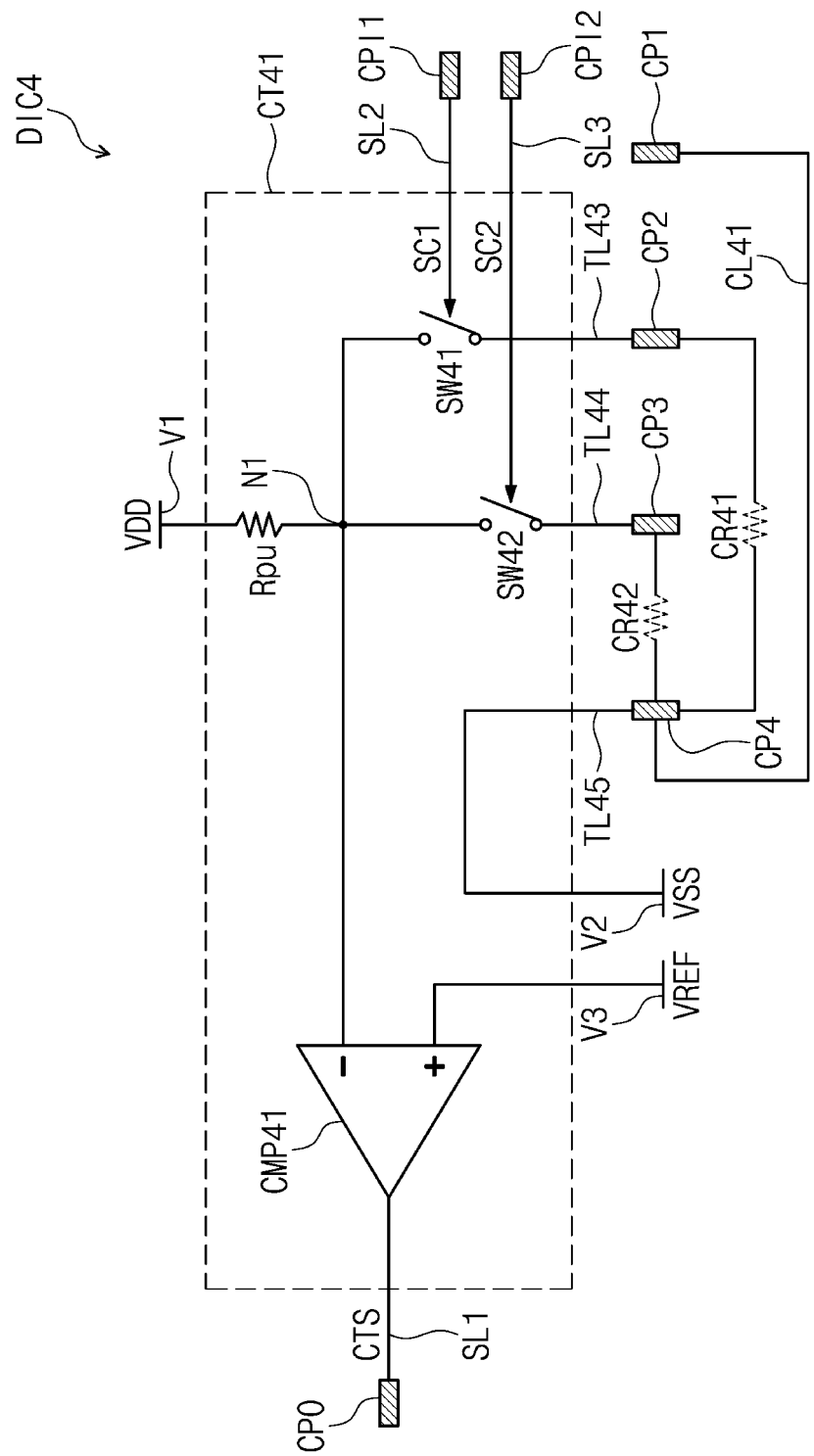
FIG. 12 is a circuit diagram illustrating circuit configuration of a driving circuit of FIG. 11.

FIG. 12 is a circuit diagram illustrating the circuit configuration of the driving circuit DIC4 of FIG. 11.

Referring to FIGS. 11 and 12, the driving circuit DIC4 may include a contact test circuit CT41. The contact test circuit CT41 may test a connection state (or a contact state) of the first and second panel pads BP1 and BP2 with the first and second connection board pads AP1 and AP2 in response to a first switching control signal SC1 inputted through the first input pad CPI1, and may output a contact test signal CTS. The contact test circuit CT41 may also test a connection state (or a contact state) of the third and fourth main contact pads CP3 and CP4 with the third and fourth main board pads DP3 and DP4 in response to a second switching control signal SC2 inputted through the second input pad CPI2, and may output a contact test signal CTS. The first switching control signal SC1 may be outputted from the main controller MC of the main board MCB4 illustrated in FIG. 11, and may be transmitted to the driving circuit DIC4 through the second test pad DPI1 and the first input pad CPI1 of the connection board FCB4. The second switching control signal SC2 may be outputted from the main controller MC of the main board MCB4 illustrated in FIG. 11, and may be transmitted to the driving circuit DIC4 through the third test pad DPI2 and the second input pad CPI2 of the connection board FCB4.

The contact test circuit CT41 may include a pull-up resistor Rpu, a first switch SW41, a second switch SW42, and a comparator CMP41. The pull-up resistor Rpu may be electrically connected between a first voltage terminal V1 and a first node N1. The first voltage terminal V1 may receive a power voltage VDD. The first switch SW41 may be electrically connected between the first node N1 and the second main contact pad CP2 and may be turned on/off in response to the first switching control signal SC1. The second switch SW42 may be electrically connected between the first node N1 and the third main contact pad CP3 and may be turned on/off in response to the second switching control signal SC2. The fourth main contact pad CP4 may be electrically connected to a second voltage terminal V2 receiving a ground voltage VSS. The first main contact pad CP1 may be electrically connected to the second voltage terminal V2 through the intermediate connection line CL41 and the fourth main contact pad CP4.

When the first switching control signal SC1 is at a set or predetermined level (e.g., a high level), the first switch SW41 may be turned on. In other words, when the first switching control signal SC1 is at the high level, a current path may be formed from the first voltage terminal V1 to the second voltage terminal V2 through the first switch SW41, the third test line TL43, the second main contact pad CP2, the second test line TL42, the second connection board pad AP2, the second panel pad BP2, the connection line CL1, the first panel pad BP1, the first connection board pad AP1, the first test line TL41, the first main contact pad CP1, the intermediate connection line CL41, the fourth main contact pad CP4, and the fifth test line TL45. Thus, a voltage divided by the pull-up resistor Rpu and a contact resistance CR41 according to the connection state (or contact state) of the first and second panel pads BP1 and BP2 with the first and second connection board pads AP1 and AP2 may be set at the first node N1.

When the second switching control signal SC2 is at a set or predetermined level (e.g., a high level), the second switch SW42 may be turned on. In other words, when the second switching control signal SC2 is at the high level, a current path may be formed from the first voltage terminal V1 to the second voltage terminal V2 through the second switch SW42, the fourth test line TL44, the third main contact pad CP3, the third main board pad DP3, the main connection line CL42, the fourth main board pad DP4, the fourth main contact pad CP4, and the fifth test line TL45. Thus, a voltage divided by the pull-up resistor Rpu and a contact resistance CR42 according to the connection state (or contact state) of the third and fourth main contact pads CP3 and CP4 with the third and fourth main board pads DP3 and DP4 may be set at the first node N1.

The comparator CMP41 may compare a voltage at the first node N1 with a reference voltage VREF received through a third voltage terminal V3, and may output the contact test signal CTS corresponding to a comparison result. The comparator CMP41 may output the contact test signal CTS at an active level (e.g., a low level) when the voltage at the first node N1 is higher in level than the reference voltage VREF. In addition, the comparator CMP41 may output the contact test signal CTS at an inactive level (e.g., a high level) when the voltage at the first node N1 is lower in level than the reference voltage VREF. The contact test circuit CT41 may operate in response to the first and second switching control signals SC1 and SC2. In a test mode, the main controller MC of FIG. 11 may sequentially output the first and second switching control signals SC1 and SC2 at set or predetermined levels (e.g., high levels) to test a connection state of the display panel DPL and the connection board FCB4 and a connection state of the connection board FCB4 and the main board MCB4.

Figure 13:
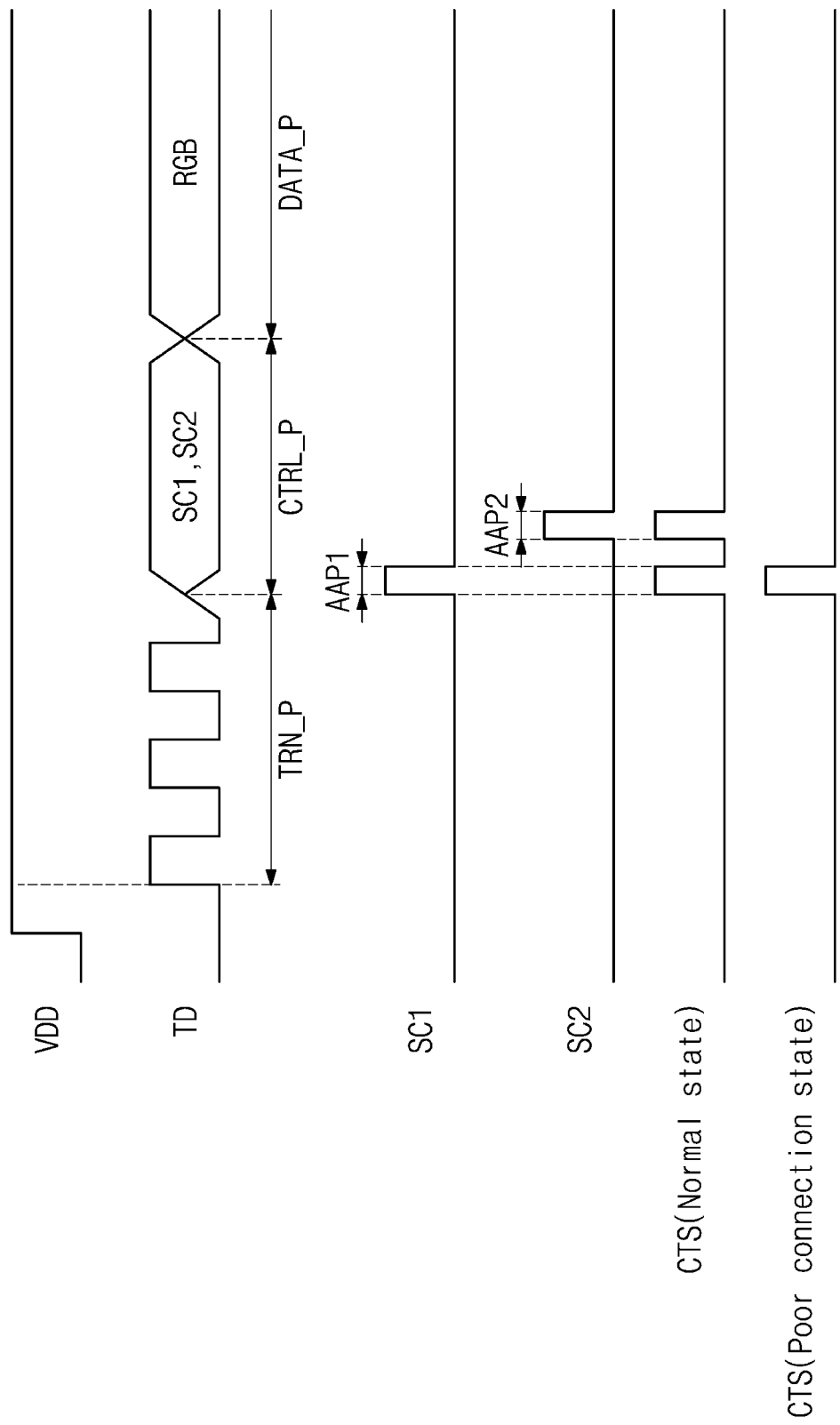
FIG. 13 is a diagram illustrating a transmission signal between a driving circuit and a main controller.

FIG. 13 is a diagram illustrating a transmission signal between the driving circuit DIC4 and the main controller MC.

Referring to FIGS. 11, 12 and 13, the driving circuit DIC4 and the main controller MC may be electrically connected to each other by one of various suitable interface methods. The interface method may be a universal serial interface (USI), a CPU interface, an RGB interface, a mobile industry processor interface (MIPI), a mobile display digital interface (MDDI), a compact display port (CDP), a mobile pixel link (MPL), a current mode advanced differential signaling (CMADS), a serial peripheral interface (SPI), an inter-integrated circuit (I2C) interface, a display port (DP) & embedded display port (eDP) interface, a camera control interface (CCI), a camera serial interface (CSI), a micro controller unit (MCU) interface, a high definition multimedia interface (HDMI), or an intra panel interface (IPI). In addition, the interface method may be one of various high-speed serial interface methods.

The main controller MC may provide the power voltage VDD and transmission data TD to the driving circuit DIC4. After the supply of the power voltage VDD is started, the main controller MC may transmit a system clock signal and a parameter signal to the driving circuit DIC4 during a training period TRN_P. The main controller MC may output the power voltage VDD and the transmission data TD to the main board pads DP illustrated in FIG. 3, and the driving circuit DIC4 may receive the power voltage VDD and the transmission data TD through the main contact pads CP connected to the main board pads DP.

The driving circuit DIC4 may restore clock signals needed for operations of the display panel DPL on the basis of the system clock signal and the parameter signal received therein, and may perform an operation for optimizing or improving a reception operation.

After the training period TRN_P is finished, the main controller MC may provide the first and second switching control signals SC1 and SC2 to the driving circuit DIC4 in a control period CTRL_P before the beginning of a data period DATA_P in which receipt of an image data signal RGB is started. Here, a first active period AAP1 of the first switching control signal SC1 may be different from a second active period AAP2 of the second switching control signal SC2.

The driving circuit DIC4 may test the connection state (or the contact state) of the first and second panel pads BP1 and BP2 with the first and second connection board pads AP1 and AP2 during the first active period AAP1 of the first switching control signal SC1, and may output the contact test signal CTS. When the first and second panel pads BP1 and BP2 are sufficiently or completely connected to the first and second connection board pads AP1 and AP2, the contact test signal CTS may be at the inactive level (e.g., the high level).

The driving circuit DIC4 may test the connection state (or the contact state) of the third and fourth main contact pads CP3 and CP4 with the third and fourth main board pads DP3 and DP4 during the second active period AAP2 of the second switching control signal SC2, and may output the contact test signal CTS. When the third and fourth main contact pads CP3 and CP4 are sufficiently or completely connected to the third and fourth main board pads DP3 and DP4, the contact test signal CTS may be at the inactive level (e.g., the high level).

When both the connection state of the display panel DPL and the connection board FCB4 and the connection state of the connection board FCB4 and the main board MCB4 are normal states (e.g., simultaneously), the contact test signal CTS may be at the inactive level (e.g., the high level) in both the first active period AAP1 and the second active period AAP2 (e.g., simultaneously). When at least one of the connection state of the display panel DPL and the connection board FCB4 or the connection state of the connection board FCB4 and the main board MCB4 is a poor connection state, the contact test signal CTS may be at the active level (e.g., the low level) in the first active period AAP1 and/or the second active period AAP2, corresponding to the poor connection state.

The main controller MC may check signal levels of the contact test signal CTS in the first and second active periods AAP1 and AAP2 to determine whether the connection state of the display panel DPL and the connection board FCB4 and the connection state of the connection board FCB4 and the main board MCB4 are normal or not.

In FIG. 13, the test mode for testing the connection state of the display panel DPL and the connection board FCB4 and the connection state of the connection board FCB4 and the main board MCB4 is performed in the control period CTRL_P. However, embodiments of the present disclosure are not limited thereto. In some embodiments, the main controller MC may perform the test mode of providing the first and second switching control signals SC1 and SC2 to the driving circuit DIC4 in a blank period (e.g., a horizontal blank period or a vertical blank period) of the data period DATA_P for receiving the image data signal RGB.

Figure 14:
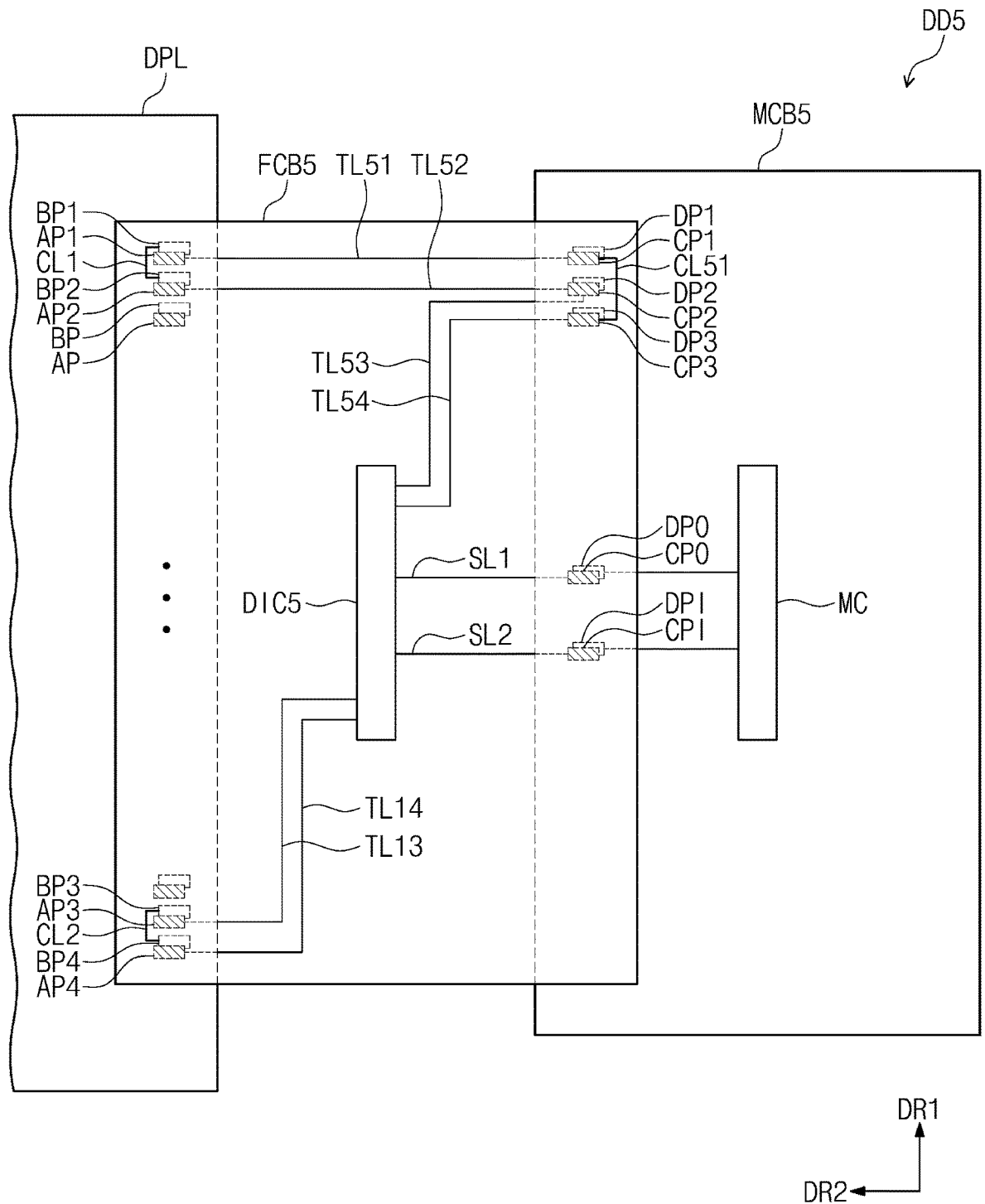
FIG. 14 is a plan view illustrating connection of a display panel and a connection board, and connection of the connection board and a main board, in a display device according to an embodiment of the present disclosure.

FIG. 14 is a plan view illustrating connection of a display panel DPL and a connection board FCB5 and connection of the connection board FCB5 and a main board MCB5 in a display device DD5 according to an embodiment of the present disclosure.

Referring to FIG. 14, the display panel DPL may include first and second panel pads BP1 and BP2, panel pads BP, and a connection line CL1. The first and second panel pads BP1 and BP2 may be test pads for testing a connection state (or a contact state) of pads of the display panel DPL and pads of the connection board FCB5. The panel pads BP may be signal pads for receiving control signals and image signals provided from a driving circuit DIC5 to the display panel DPL. The panel pads BP may be electrically connected to the data lines DL, the scan control line SCL, the initialization voltage line VINTL, and the voltage line VL, which are illustrated in FIG. 3.

The connection board FCB5 may include first and second connection board pads AP1 and AP2, first to third main contact pads CP1 to CP3, first to fourth test lines TL51 to TL54, first and second signal lines SL1 and SL2, an input pad CPI, an output pad CPO, an intermediate connection line CL51, and a driving circuit DIC5.

The first and second test lines TL51 and TL52 may electrically connect the first and second connection board pads AP1 and AP2 to the first and second main contact pads CP1 and CP2, respectively. The third and fourth test lines TL53 and TL54 may electrically connect the second and third main contact pads CP2 and CP3 to the driving circuit DIC5.

The first and second signal lines SL1 and SL2 may electrically connect the output pad CPO and the input pad CPI to the driving circuit DIC5.

The main board MCB5 may include first to third main board pads DP1 to DP3, first and second test pads DPO and DPI, and a main controller MC. The intermediate connection line CL51 may electrically connect the first main contact pad CP1 to the third main contact pad CP3.

Figure 15:
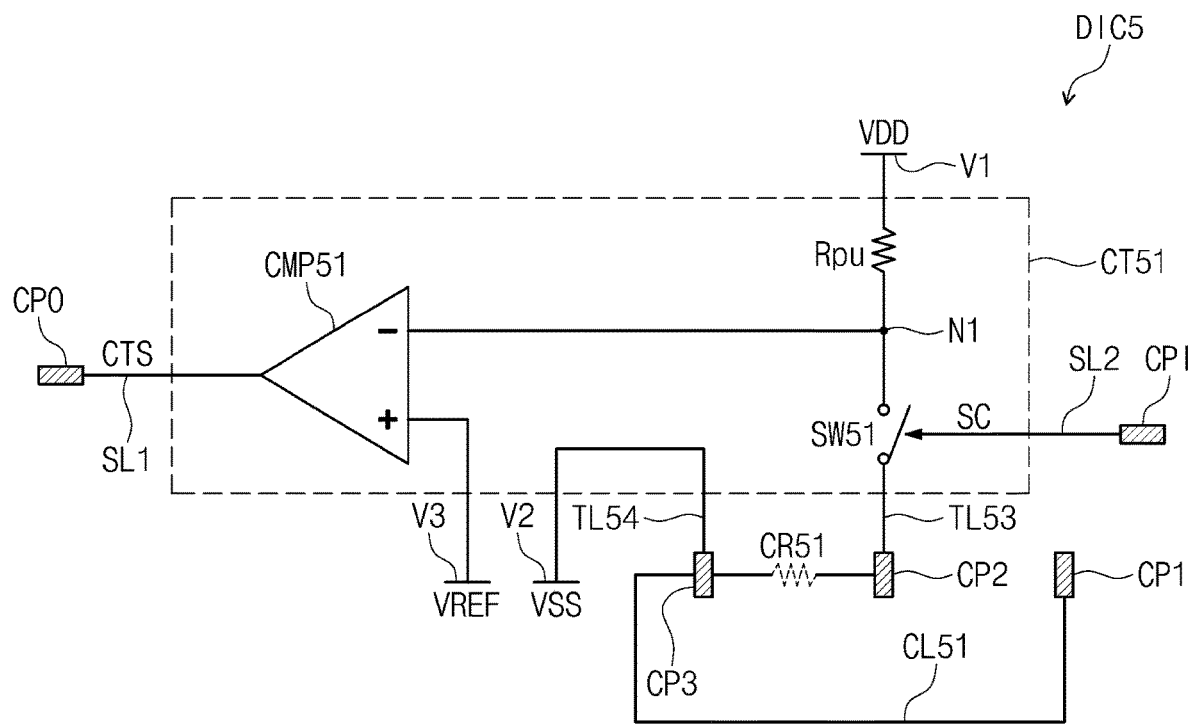
FIG. 15 is a circuit diagram illustrating circuit configuration of a driving circuit of FIG. 14.

FIG. 15 is a circuit diagram illustrating circuit configuration of the driving circuit DIC5 of FIG. 14.

Referring to FIGS. 14 and 15, the driving circuit DIC5 may include a contact test circuit CT51. The contact test circuit CT51 may test a connection state (or a contact state) of the first and second panel pads BP1 and BP2 with the first and second connection board pads AP1 and AP2 in response to a switching control signal SC inputted through the input pad CPI, and may output a contact test signal CTS. The switching control signal SC may be outputted from the main controller MC of the main board MCB5 illustrated in FIG. 14, and may be transmitted to the driving circuit DIC5 through the second test pad DPI and the input pad CPI of the connection board FCB5.

The contact test circuit CT51 may include a pull-up resistor Rpu, a switch SW51, and a comparator CMP51. The pull-up resistor Rpu may be electrically connected between a first voltage terminal V1 and a first node N1. The first voltage terminal V1 may receive a power voltage VDD. The switch SW51 may be electrically connected between the first node N1 and the second main contact pad CP2 and may be turned on/off in response to the switching control signal SC. The third main contact pad CP3 may be electrically connected to a second voltage terminal V2 receiving a ground voltage VSS. The first main contact pad CP1 may be electrically connected to the second voltage terminal V2 through the intermediate connection line CL51 and the third main contact pad CP3.

When the switching control signal SC is at a set or predetermined level (e.g., a high level), the switch SW51 may be turned on. In other words, when the switching control signal SC is at the high level, a current path may be formed from the first voltage terminal V1 to the second voltage terminal V2 through the switch SW51, the third test line TL53, the second main contact pad CP2, the second test line TL52, the second connection board pad AP2, the second panel pad BP2, the connection line CL1, the first panel pad BP1, the first connection board pad AP1, the first test line TL51, the first main contact pad CP1, the intermediate connection line CL51, the third main contact pad CP3, and the fourth test line TL54. Thus, a voltage divided by the pull-up resistor Rpu and a contact resistance CR51 according to the connection state (or contact state) of the first and second panel pads BP1 and BP2 with the first and second connection board pads AP1 and AP2 may be set at the first node N1.

The comparator CMP51 may compare a voltage at the first node N1 with a reference voltage VREF received through a third voltage terminal V3, and may output the contact test signal CTS corresponding to a comparison result. The comparator CMP51 may output the contact test signal CTS at an active level (e.g., a low level) when the voltage at the first node N1 is higher in level than the reference voltage VREF. In addition, the comparator CMP51 may output the contact test signal CTS at an inactive level (e.g., a high level) when the voltage at the first node N1 is lower in level than the reference voltage VREF.

In a test mode, the main controller MC of FIG. 14 may output the switching control signal SC at a set or predetermined level (e.g., the high level) to test a connection state of the display panel DPL and the connection board FCB5.

Figure 16:
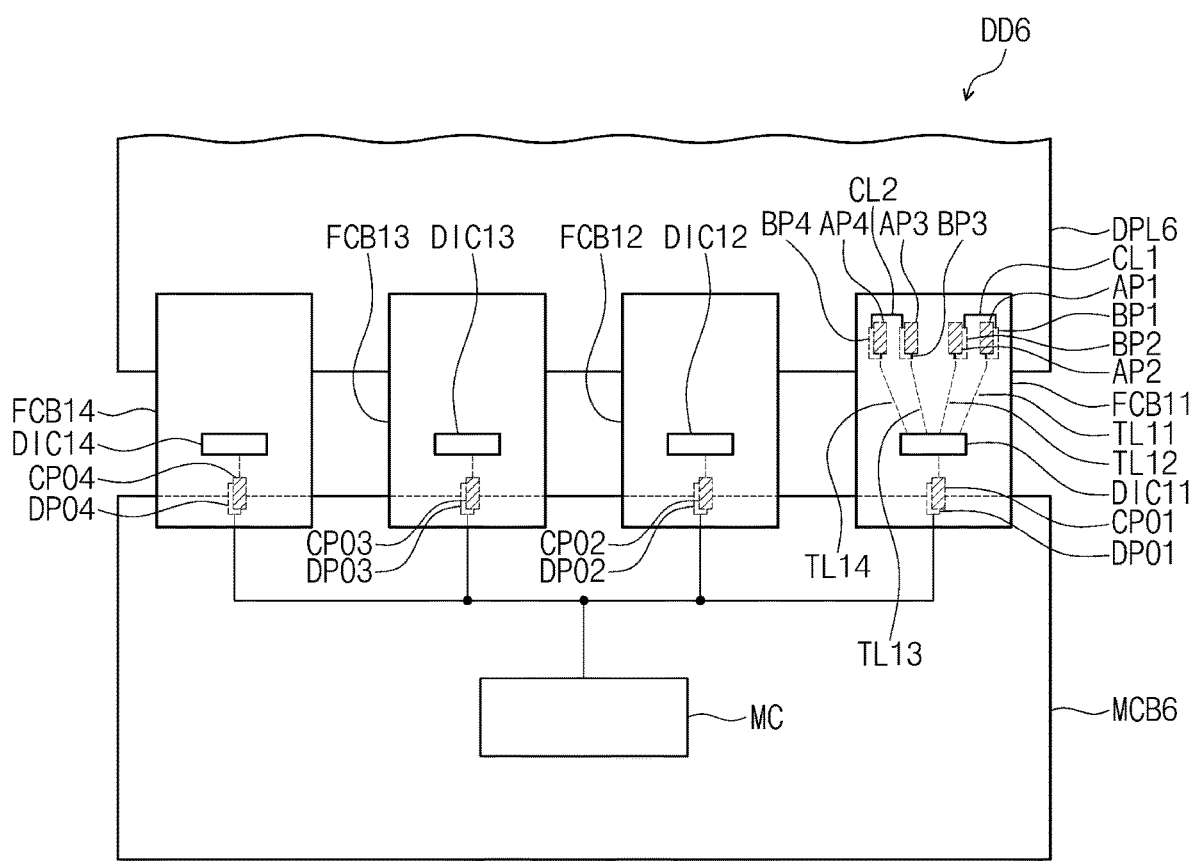
FIG. 16 is a plan view illustrating a display device according to an embodiment of the present disclosure.

FIG. 16 is a plan view illustrating a display device DD6 according to an embodiment of the present disclosure.

Referring to FIG. 16, the display device DD6 may include a display panel DPL6, first to fourth connection boards FCB11 to FCB14, and a main board MCB6. The first to fourth connection boards FCB11 to FCB14 may include first to fourth driving circuits DIC11 to DIC14, respectively. Each of the first to fourth driving circuits DIC11 to DIC14 may be an integrated circuit (IC). The first to fourth connection boards FCB11 to FCB14 may be flexible printed circuit boards on which the first to fourth driving circuits DIC11 to DIC14 of the integrated circuits are mounted. For example, each of the first to fourth connection boards FCB11 to FCB14 may be a chip-on-film (COF). Each of the first to fourth connection boards FCB11 to FCB14 may include other integrated circuit(s) in addition to each of the first to fourth driving circuits DIC11 to DIC14.

The display panel DPL6 may include first to fourth panel pads BP1 to BP4 corresponding to the first connection board FCB11. The first to fourth panel pads BP1 to BP4 corresponding to the first connection board FCB11 are illustrated in FIG. 16. However, the display panel DPL6 may include first to fourth panel pads corresponding to each of the second to fourth connection boards FCB12 to FCB14. In some embodiments, the display panel DPL6 may include the first to fourth panel pads BP1 to BP4 corresponding to one or some of the first to fourth connection boards FCB11 to FCB14. For example, the display panel DPL6 may include the first to fourth panel pads BP1 to BP4 corresponding to the first connection board FCB11 and the first to fourth panel pads corresponding to the fourth connection board FCB14, but may not include the first to fourth panel pads corresponding to each of the second and third connection boards FCB12 and FCB13.

The display panel DPL6 of FIG. 16 includes four panel pads (i.e., the first to fourth panel pads BP1 to BP4) corresponding to the first connection board FCB11. As an example, the display panel DPL6 may include only the first panel pad BP1 and the second panel pad BP2.

The first panel pad BP1 and the second panel pad BP2 may be electrically connected to each other through a connection line CL1. The third panel pad BP3 and the fourth panel pad BP4 may be electrically connected to each other through a connection line CL2.

The first and second panel pads BP1 and BP2 may be disposed adjacent to a side of the display panel DPL6, and the third and fourth panel pads BP3 and BP4 may be disposed adjacent to another side of the display panel DPL6. In other words, the first and second panel pads BP1 and BP2 may be spaced apart from the third and fourth panel pads BP3 and BP4 in the first direction DR1.

The first connection board FCB11 may include first to fourth connection board pads AP1 to AP4. The first to fourth connection board pads AP1 to AP4 may be electrically connected to the first to fourth panel pads BP1 to BP4, respectively. FIG. 16 shows only the first to fourth connection board pads AP1 to AP4 of the first connection board FCB11. However, each of the second to fourth connection boards FCB12 to FCB14 may include first to fourth connection board pads, which are substantially the same as the first to fourth connection board pads AP1 to AP4 of the first connection board FCB11.

The first connection board FCB11 may include first to fourth panel test lines TL11 to TL14. The first driving circuit DIC11 may be electrically connected to the first to fourth connection board pads AP1 to AP4 through the first to fourth panel test lines TL11 to TL14, respectively.

The first driving circuit DIC11 may test a connection state (or a contact state) of the first and second panel pads BP1 and BP2 with the first and second connection board pads AP1 and AP2. The first driving circuit DIC11 may output a first contact test signal to an output pad CPO1. The second to fourth driving circuits DIC12 to DIC14 may output second to fourth contact test signals to output pads CPO2 to CPO4, respectively.

The main controller MC may receive the contact test signals through test pads DPO1 to DPO4 electrically connected to the output pads CPO1 to CPO4.

Each of the first to fourth connection boards FCB11 to FCB14 of FIG. 16 may include substantially the same components as the connection board FCB1 of FIG. 5. In certain embodiments, each of the first to fourth connection boards FCB11 to FCB14 of FIG. 16 may include substantially the same components as the connection board FCB2 of FIG. 7, the connection board FCB3 of FIG. 9, the connection board FCB4 of FIG. 11, and/or the connection board FCB5 of FIG. 14.

Figure 17:
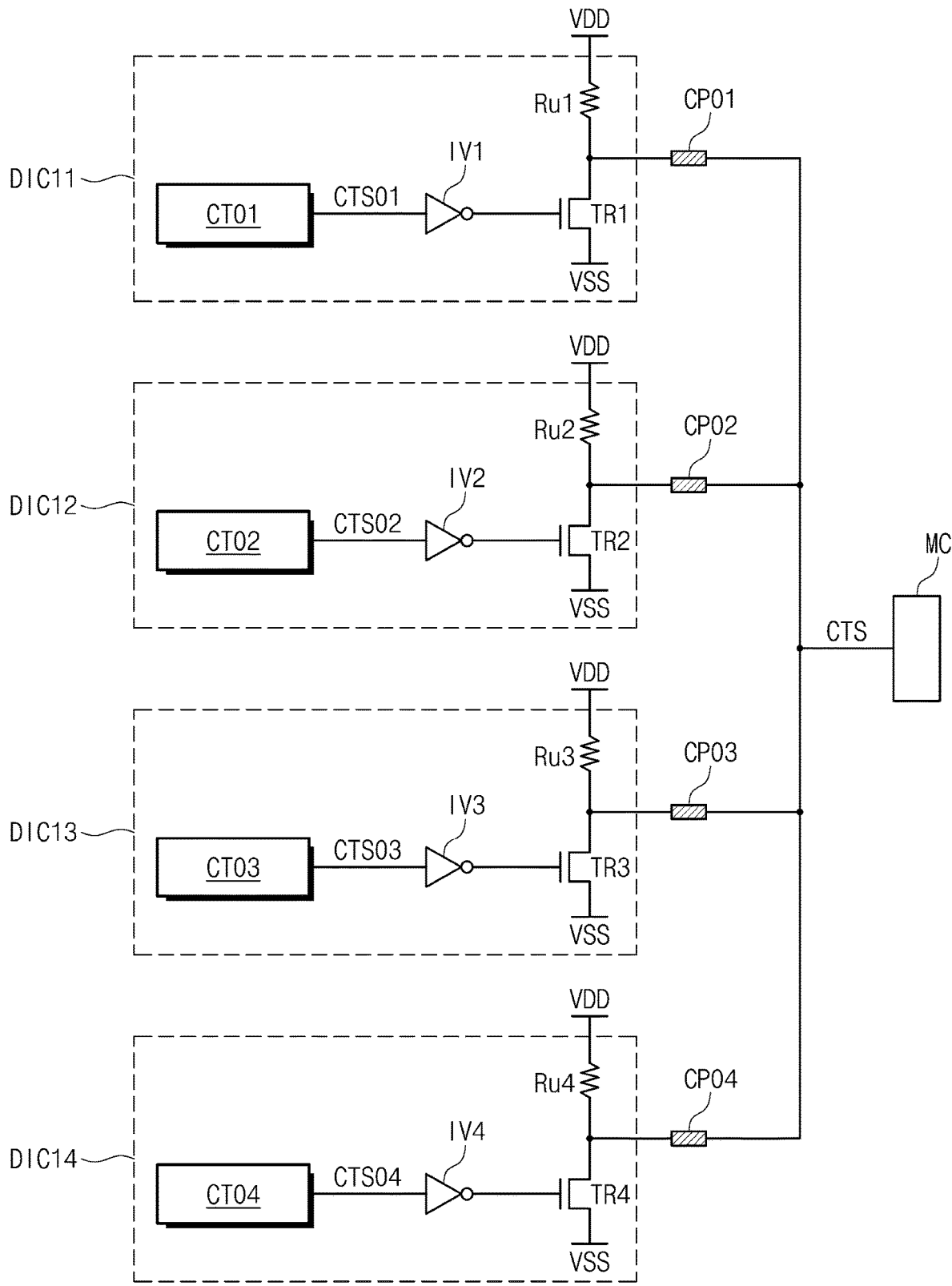
FIG. 17 is a circuit diagram illustrating the circuit configuration of first to fourth driving circuits of FIG. 16.
Figure 18A:
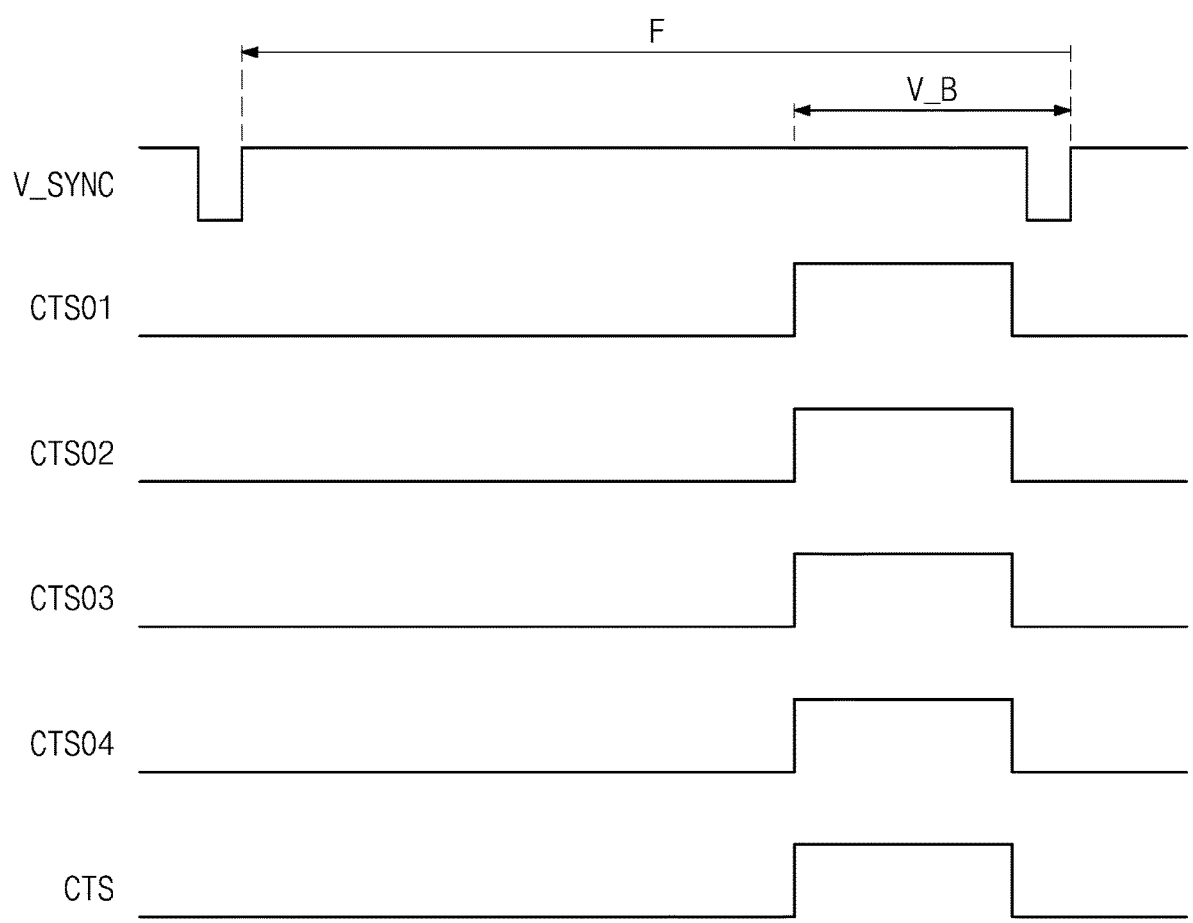
FIGS. 18A and 18B are timing diagrams illustrating the timing of first to fourth contact test signals outputted from first to fourth driving circuits, and a contact test signal received in a main controller.
Figure 18B:
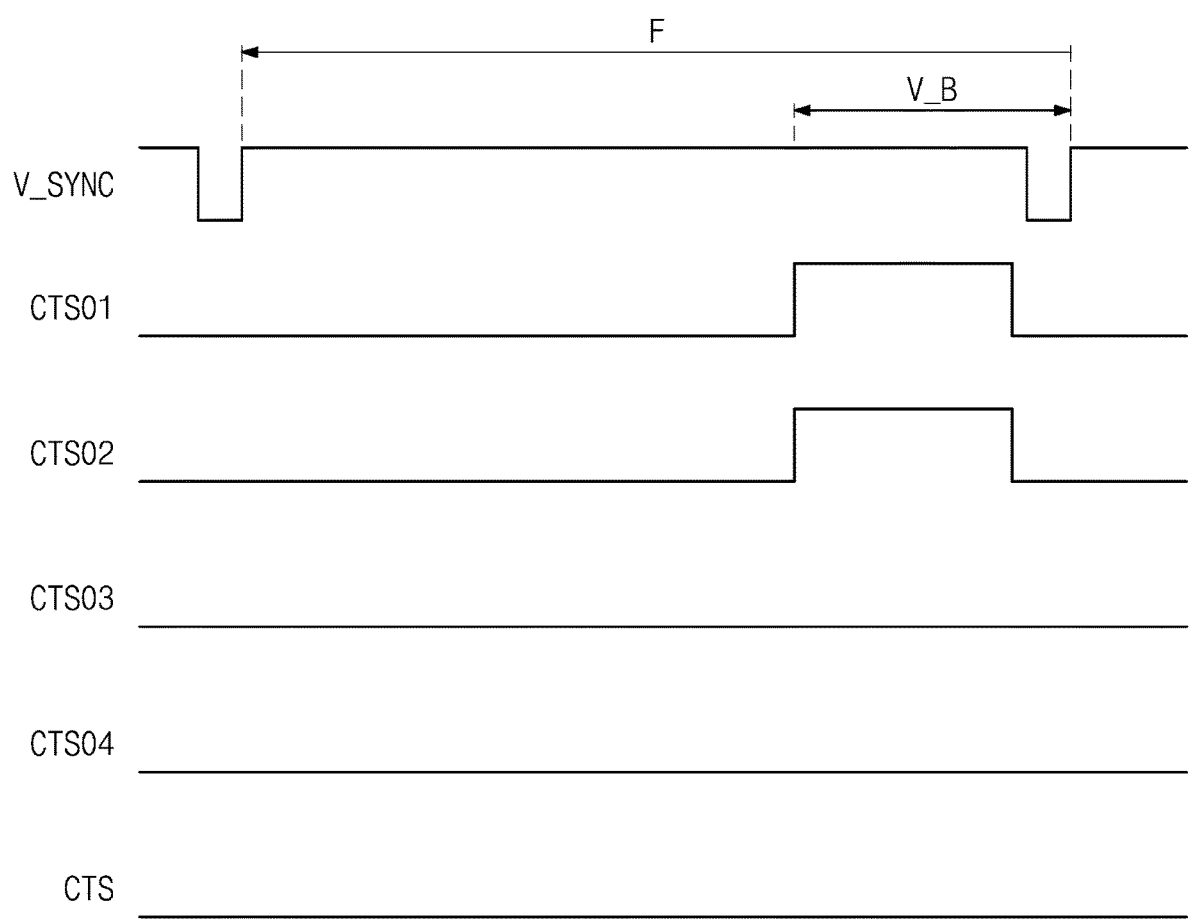

FIG. 17 is a circuit diagram illustrating the circuit configuration of the first to fourth driving circuits DIC11 to DIC14 of FIG. 16. FIGS. 18A and 18B are timing diagrams illustrating the timing of first to fourth contact test signals outputted from first to fourth driving circuits and a contact test signal received in a main controller.

Referring to FIG. 17, the first driving circuit DIC11 may include a contact test circuit CT01, an inverter IV1, a pull-up resistor Ru1, and a transistor TR1. The contact test circuit CT01 may test a connection state of the display panel DPL6 and the first connection board FCB11 and/or a connection state of the first connection board FCB11 and the main board MCB6, and may output a first contact test signal CTS01. The inverter IV1 may invert the first contact test signal CTS01 and may output the inverted first contact test signal CTS01. The pull-up resistor Ru1 may be electrically connected between a terminal receiving a power voltage VDD and the output pad CPO1. The transistor TR1 may include a first electrode electrically connected to the output pad CPO1, a second electrode receiving a ground voltage VSS, and a gate electrode electrically connected to an output terminal of the inverter IV1.

Each of the second to fourth driving circuits DIC12 to DIC14 may have a circuit configuration analogous to that of the first driving circuit DIC11 (e.g., as indicated by analogous but consecutively numbered element labels such as CT01, CT02, CT03, CT04, etc.), and additional detailed descriptions thereof will be omitted.

For example, when the connection state of the display panel DPL6 and the first connection board FCB11 is a normal state and the connection state of the first connection board FCB11 and the main board MCB6 is a normal state, the contact test circuit CT01 may output the first contact test signal CTS01 at a high level. Because the transistor TR1 is turned off when an output signal of the inverter IV1 is at a low level, a voltage level of the output pad CPO1 may be maintained at a high level corresponding to the power voltage VDD through the pull-up resistor Ru1.

When the connection state of the display panel DPL6 and the first connection board FCB11 is a poor connection state, or the connection state of the first connection board FCB11 and the main board MCB6 is a poor connection state, the contact test circuit CT01 may output the first contact test signal CTS01 at a low level. Because the transistor TR1 is turned on when the output signal of the inverter IV1 is a high level, the voltage at the output pad CPO1 may be discharged to the ground voltage VSS. Thus, the voltage level of the output pad CPO1 may be modified to be at a low level corresponding to the ground voltage VSS.

As illustrated in FIG. 18A, when all of the first to fourth contact test signals CTS01 to CTS04 outputted from the contact test circuits CT01 to CTO4 in the first to fourth driving circuits DIC11 to DIC14 are at high levels, all of the transistors TR1 to TR4 may be turned off, and thus the contact test signal CTS provided to the main controller MC may be a high level. When the contact test signal CTS is at the high level, the main controller MC may determine that all of the first to fourth connection boards FCB11 to FCB14 of FIG. 16 are in the normal connection state.

As illustrated in FIG. 18B, the first and second contact test signals CTS01 and CTS02 outputted from the contact test circuits CT01 and CTO2 in the first and second driving circuits DIC11 and DIC12 may be at high levels, and the third and fourth contact test signals CTS03 and CTS04 outputted from the contact test circuits CTO3 and CTO4 in the third and fourth driving circuits DIC13 and DIC14 may be at low levels. In this case, the transistors TR3 and TR4 may be turned on by the third and fourth contact test signals CTS03 and CTS04. Because the output pads CPO1 to CPO4 are electrically connected in common to each other, the contact test signal CTS provided to the main controller MC may be at a low level. When the contact test signal CTS is at the low level, the main controller MC may determine that at least one of the first to fourth connection boards FCB11 to FCB14 of FIG. 16 is in the poor connection state.

As illustrated in FIGS. 18A and 18B, the main controller MC may provide a synchronization signal V_SYNC to the first to fourth driving circuits DIC11 to DIC14. The synchronization signal V_SYNC may be a vertical synchronization signal transitioned in each frame F of an image signal. The first to fourth driving circuits DIC11 to DIC14 may output the first to fourth contact test signals CTS01 to CTS04 in a blank period V_B of the synchronization signal V_SYNC. In some embodiments, the first to fourth driving circuits DIC11 to DIC14 may be synchronized with other synchronization signal (e.g., a horizontal synchronization signal or a clock signal) instead of the vertical synchronization signal to output the first to fourth contact test signals CTS01 to CTS04.

The driving circuit of the display device having the configuration described above may test whether the display panel and the connection board are normally connected to each other or not, and may provide a signal corresponding to the test result to the main controller. In addition, the driving circuit of the display device may test whether the connection board and the main board are normally connected to each other or not, and may provide a signal corresponding to the test result to the main controller. Thus, the manufacturing process efficiency of the display device may be improved.

The electronic or electric devices and/or any other relevant devices or components according to embodiments of the present disclosure described herein, such as, for example, a timing controller, a data driver, and a gate driver, may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of ordinary skill in the art should recognize that the functionality of various computing/electronic devices may be combined or integrated into a single computing/electronic device, or the functionality of a particular computing/electronic device may be distributed across one or more other computing/electronic devices without departing from the spirit and scope of the present disclosure.

While the present disclosure have been described with reference to example embodiments, it will be apparent to those skilled in the art that various changes and modifications may be made without departing from the spirits and scope of the present disclosure. Therefore, it should be understood that the above embodiments are not limiting, but illustrative. Thus, the scope of the present disclosure are to be determined by the broadest permissible interpretation of the following claims and their equivalents, and shall not be restricted or limited by the foregoing description.

What is claimed is:
1. A display device comprising:
a display panel comprising a data line, first and second panel pads, and a connection line electrically connected between the first and second panel pads; and
a connection board comprising first and second connection board pads and an output pad; and
a driving circuit on the connection board to drive the data line,
wherein the driving circuit comprises:
a pull-up resistor electrically connected between a first voltage terminal and a first node; and
a comparator to compare a voltage at the first node with a reference voltage and to output a contact test signal corresponding to a comparison result to the output pad,
wherein the first connection board pad is electrically connected to the first node, the second connection board pad is electrically connected to a second voltage terminal, and
wherein when the first and second connection board pads are electrically connected to the first and second panel pads, respectively:
the first panel pad is electrically connected between the first connection board pad and the connection line, and the second panel pad is electrically connected between the connection line and the second connection board pad; and
a current path is formed in series from the first voltage terminal of the driving circuit to the second voltage terminal of the driving circuit through the pull-up resistor, a first test line, the first connection board pad, the first panel pad, the connection line of the display panel, the second panel pad, the second connection board pad and a second test line.
2. The display device of claim 1, further comprising:
a main board comprising a first test pad electrically connected to the output pad and a main controller,
wherein the main controller is to receive the contact test signal through the first test pad.
3. The display device of claim 1, wherein the connection board further comprises an input pad,
wherein the driving circuit further comprises a switch, and
wherein the switch is electrically connected between the first connection board pad and the first node, and is to operate in response to a switching control signal inputted through the input pad.
4. The display device of claim 3, further comprising:
a main board comprising first and second test pads electrically connected to the output pad and the input pad, respectively, and a main controller,
wherein the main controller is to output the switching control signal to the second test pad and receive the contact test signal through the first test pad.
5. The display device of claim 1, wherein a first voltage provided to the first voltage terminal is higher in level than a second voltage provided to the second voltage terminal.
6. The display device of claim 5, wherein the comparator is to output the contact test signal at an active level when the voltage at the first node is higher in level than the reference voltage, and
wherein the comparator is to output the contact test signal at an inactive level when the voltage at the first node is lower in level than the reference voltage.
7. The display device of claim 1, wherein the driving circuit is an integrated circuit, and
wherein the connection board is a chip-on-film on which the driving circuit is mounted.

8. A display device comprising:
a display panel comprising a data line, and first and second panel pads electrically connected to each other;
a main board comprising first to fourth main board pads, a first test pad, a main controller, and a connection line electrically connected between the third main board pad and the fourth main board pad; and
a connection board, and
a driving circuit disposed on the connection board and to drive the data line,
wherein the connection board comprises:
first and second connection board pads electrically connected to the first and second panel pads, respectively;
first to fourth main contact pads;
first and second test lines electrically connecting the first and second connection board pads to the first and second main contact pads, respectively;
an intermediate connection line electrically connecting the first main contact pad to the fourth main contact pad; and
an output pad electrically connected to the first test pad;
wherein the third main board pad and the fourth main board pad are electrically connected to each other,
wherein the driving circuit comprises:
a pull-up resistor electrically connected between a first voltage terminal and a first node; and
a comparator to compare a voltage at the first node with a reference voltage and to output a contact test signal corresponding to a comparison result to the output pad,
wherein the second main contact pad is electrically connected to the first node, and the fourth main contact pad is electrically connected to a second voltage terminal through the intermediate connection line and the fourth main contact pad,
wherein when the first to fourth main contact pads are electrically connected to the first to fourth main board pads, respectively:
the third main board pad is electrically connected between the third main contact pad and the connection line, and the fourth main board pad is electrically connected between the connection line and the fourth main contact pad; and
a current path is formed in series from the first voltage terminal of the driving circuit to the second voltage terminal of the driving circuit through the pull-up resistor, a third test line, the third main contact pad, the third main board pad, the connection line of the main board, the fourth main board pad, the fourth main contact pad and a fourth test line, and
wherein the main controller is to receive the contact test signal through the first test pad.

9. The display device of claim 8, wherein the connection board further comprises a first input pad,
wherein the main board further comprises: a main connection line electrically connecting the third main board pad to the fourth main board pad; and a second test pad electrically connected to the first input pad, and
wherein the main controller is to provide a first switching control signal to the driving circuit through the second test pad.

10. The display device of claim 9, wherein the driving circuit further comprises a first switch, and
wherein the first switch is electrically connected between the second main contact pad and the first node and is to operate in response to the first switching control signal inputted through the first input pad.

11. The display device of claim 10, wherein the connection board further comprises a second input pad,
wherein the main board further comprises a third test pad electrically connected to the second input pad, and
wherein the main controller is to provide a second switching control signal to the driving circuit through the third test pad.

12. The display device of claim 11, wherein the driving circuit further comprises a second switch, and
wherein the second switch is electrically connected between the third main contact pad and the first node and is to operate in response to the second switching control signal inputted through the second input pad.

13. The display device of claim 12, wherein the first switching control signal and the second switching control signal are activated at different time points from each other.

14. The display device of claim 9, wherein the main controller is to provide the first switching control signal to the driving circuit in a control period after a supply of a power voltage is started.

15. The display device of claim 9, wherein the main controller is to provide the first switching control signal to the driving circuit in a blank period of a synchronization signal.

16. The display device of claim 8, wherein a first voltage provided to the first voltage terminal is higher in level than a second voltage provided to the second voltage terminal.

17. The display device of claim 16, wherein the comparator is to output the contact test signal at an active level when the voltage at the first node is higher in level than the reference voltage, and
wherein the comparator is to output the contact test signal at an inactive level when the voltage at the first node is lower in level than the reference voltage.

18. The display device of claim 8, wherein the driving circuit is an integrated circuit, and
wherein the connection board is a chip-on-film on which the driving circuit is mounted.

19. A method for testing pad connection of a display device comprising a display panel comprising first and second panel pads electrically connected to each other; and a connection board comprising first and second connection board pads connected to the first and second panel pads, respectively, an input pad, and an output pad, the method comprising:
electrically connecting the first and second connection board pads to the first and second panel pads, respectively;
electrically connecting the first connection board pad to a first node in response to a switching control signal received through the input pad; and
comparing a voltage at the first node with a reference voltage and outputting a contact test signal corresponding to a comparison result to the output pad,
wherein the first panel pad is connected to the second panel pad via a connection line on the display panel,
the first node is connected to a first voltage terminal of a driving circuit via a pull-up resistor,
the second connection board pad is electrically connected to a second voltage terminal of the driving circuit, and
when the first and second connection board pads are electrically connected to the first and second panel pads, respectively:
the first panel pad is electrically connected between the first connection board pad and the connection line, and the second panel pad is electrically connected between the connection line and the second connection board pad; and a current path is formed in series from the first voltage terminal of the driving circuit to the second voltage terminal of the driving circuit through the pull-up resistor, a first test line, the first connection board pad, the first panel pad, the connection line on the display panel, the second panel pad, the second connection board pad and a second test line.

20. The method of claim 19, wherein the display device further comprises:

a main board comprising first and second test pads electrically connected to the output pad and the input pad, respectively, and a main controller, wherein the main controller outputs the switching control signal to the second test pad and receives the contact test signal through the first test pad.

* * * * *